United States Patent
Hemphill

(10) Patent No.: US 12,054,959 B2
(45) Date of Patent: Aug. 6, 2024

(54) CONCRETE REPAIR DEVICE

(71) Applicant: Garland Industries, Inc., Cleveland, OH (US)

(72) Inventor: Scott Hemphill, Wilmington, DE (US)

(73) Assignee: GARLAND INDUSTRIES, INC., Cleveland, OH (US)

(*) Notice: Subject to any disclaimer, the term of this patent is extended or adjusted under 35 U.S.C. 154(b) by 295 days.

(21) Appl. No.: 17/508,578

(22) Filed: Oct. 22, 2021

(65) Prior Publication Data

US 2022/0120103 A1    Apr. 21, 2022

Related U.S. Application Data

(63) Continuation-in-part of application No. 29/773,597, filed on Mar. 10, 2021, now Pat. No. Des. 979,385, and a continuation-in-part of application No. 29/755,392, filed on Oct. 20, 2020.

(60) Provisional application No. 63/158,923, filed on Mar. 10, 2021, provisional application No. 63/111,218, filed on Nov. 9, 2020.

(51) Int. Cl.
*E04G 23/02* (2006.01)
*B32B 5/26* (2006.01)

(52) U.S. Cl.
CPC ............ *E04G 23/0218* (2013.01); *B32B 5/26* (2013.01); *B32B 2250/03* (2013.01); *B32B 2556/00* (2013.01); *E04G 2023/0251* (2013.01)

(58) Field of Classification Search
CPC ... B32B 5/26; B32B 2250/03; B32B 2556/00; E04G 23/0218; E04G 2023/0251
USPC .......................................................... 52/514
See application file for complete search history.

(56) References Cited

U.S. PATENT DOCUMENTS

| | | | |
|---|---|---|---|
| 1,223,045 A | 4/1917 | Ferguson | |
| 4,935,301 A | 6/1990 | Rerup et al. | |
| 5,476,340 A | 12/1995 | Contrasto | |
| 5,513,925 A | 5/1996 | Dempsey et al. | |
| 5,763,043 A | 6/1998 | Porter et al. | |
| 5,771,557 A * | 6/1998 | Contrasto | E04G 23/0218 29/402.11 |
| 6,052,964 A | 4/2000 | Ferm et al. | |
| 6,183,835 B1 | 2/2001 | Cho et al. | |
| 6,185,897 B1 | 2/2001 | Johnson et al. | |

(Continued)

FOREIGN PATENT DOCUMENTS

EP    0441519 A1    11/1996

OTHER PUBLICATIONS

Burr et al., "Recent developments in the use of FRP anchors and masonry wall strengthening techniques" The Structural Engineer, 21, pp. 20-21 (Sep. 2004).

(Continued)

*Primary Examiner* — James J Buckle, Jr.
(74) *Attorney, Agent, or Firm* — UB Greensfelder LLP; Brian Erkin Turung

(57) ABSTRACT

An improved composite material used to connect, strengthen and/or repair concrete. The improved composite material includes a first fiber system including at least one fiber layer. Each fiber layer includes a plurality of fibers. The binding material can be used to optionally secure together the plurality of fibers. The improved composite material is positioned and secured in a slot cut in a concrete structure. The top edge of the improved composite material includes a recess portion.

25 Claims, 9 Drawing Sheets

(56) References Cited

U.S. PATENT DOCUMENTS

| | | |
|---|---|---|
| 6,263,629 B1 | 7/2001 | Brown, Jr. et al. |
| 6,312,541 B1 | 11/2001 | Hemphill |
| 6,330,776 B1 | 12/2001 | Jinno et al. |
| 6,389,775 B1 | 5/2002 | Steiner et al. |
| 6,416,693 B1 | 7/2002 | Lockwood |
| 6,532,714 B1 | 3/2003 | Ferm et al. |
| 6,851,232 B1 * | 2/2005 | Schwegler .......... E04G 23/0218 156/254 |
| 7,207,149 B2 | 4/2007 | Fyfe et al. |
| RE39,839 E | 9/2007 | Wheatley et al. |
| 7,311,964 B2 | 12/2007 | Aldea et al. |
| 7,574,840 B1 | 8/2009 | Fyfe |
| 7,736,088 B2 | 6/2010 | Boxall et al. |
| 8,087,210 B2 * | 1/2012 | Agneloni .......... E04G 23/0218 52/741.3 |
| 8,567,146 B2 * | 10/2013 | Hemphill .......... B32B 3/02 52/582.1 |
| 9,194,140 B2 * | 11/2015 | Hemphill .......... E04G 23/0218 |
| 11,814,888 B2 * | 11/2023 | Hellwig .......... E05F 1/006 |
| 2001/0047844 A1 | 12/2001 | Edwards et al. |
| 2001/0049399 A1 | 12/2001 | Edwards et al. |
| 2006/0162845 A1 | 7/2006 | Bogard et al. |

OTHER PUBLICATIONS

Kim et al., "Behaviour of Handmade FRP anchors under tensile load in uncracked concrete" Advances in Structural Engineering, vol. 12, No. 6, pp. 845-865 (2009).

Neimitz et al., "Experimental behavior of carbon fiber-reinforced polymer (CRFP) sheets attached to concrete surfaces using CRFP anchors", Jour. of Composites for Construction, pp. 185-194 (2010).

Özdemir, Gokhan, "Mechanical properties of CFRP anchorages" Thesis, Middle East Technical Univ., Jan. 2005.

Pham, Le Tuan, "Development of a quality control test for carbon fiber reinforced polymer anchors" Thesis, Univ. of Texas at Austin, May 2009.

* cited by examiner

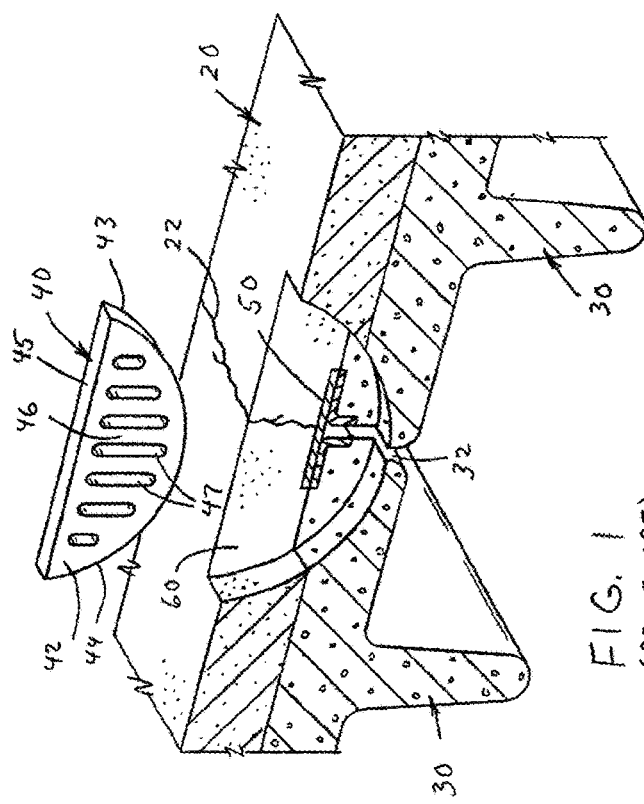
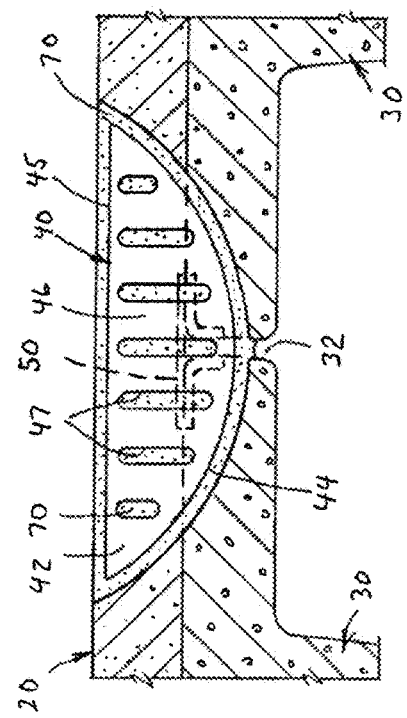
FIG. 1 (PRIOR ART)
FIG. 2 (PRIOR ART)

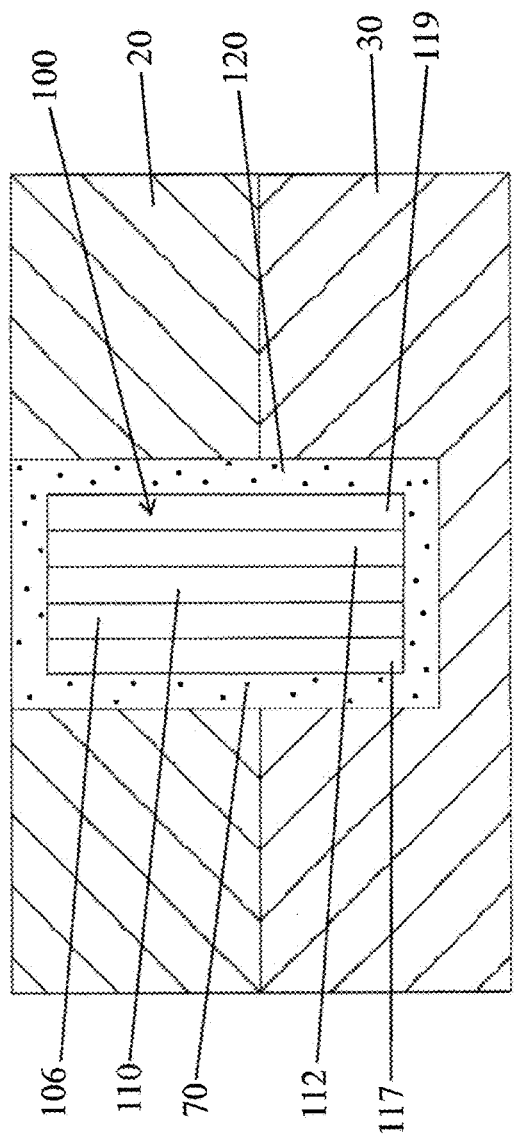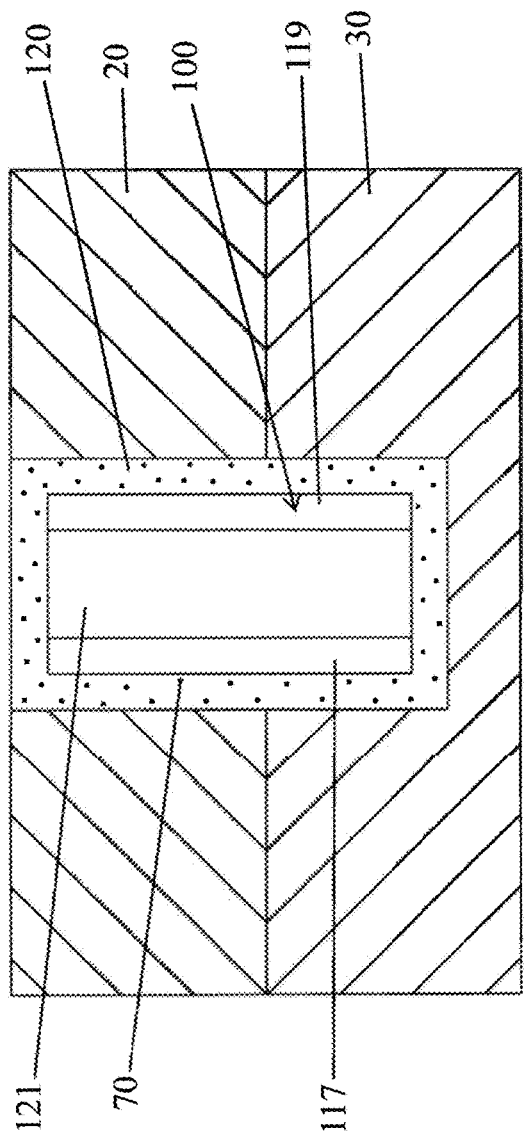

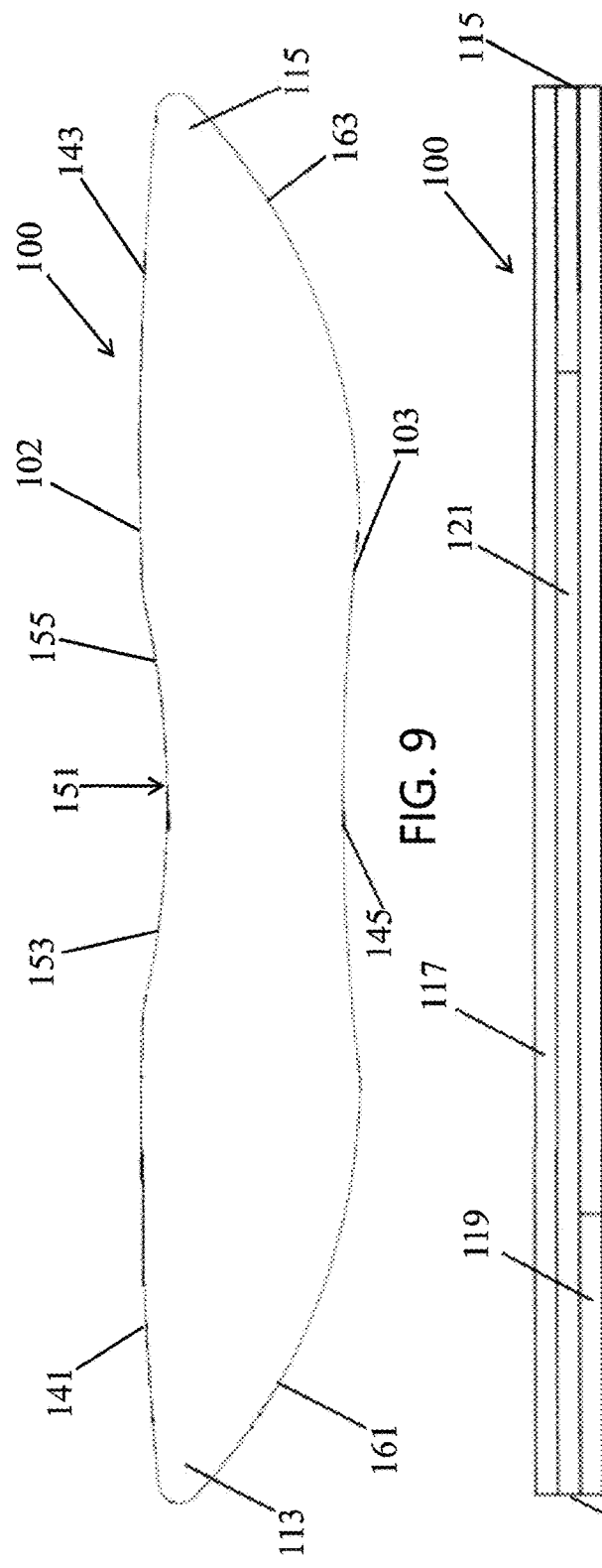
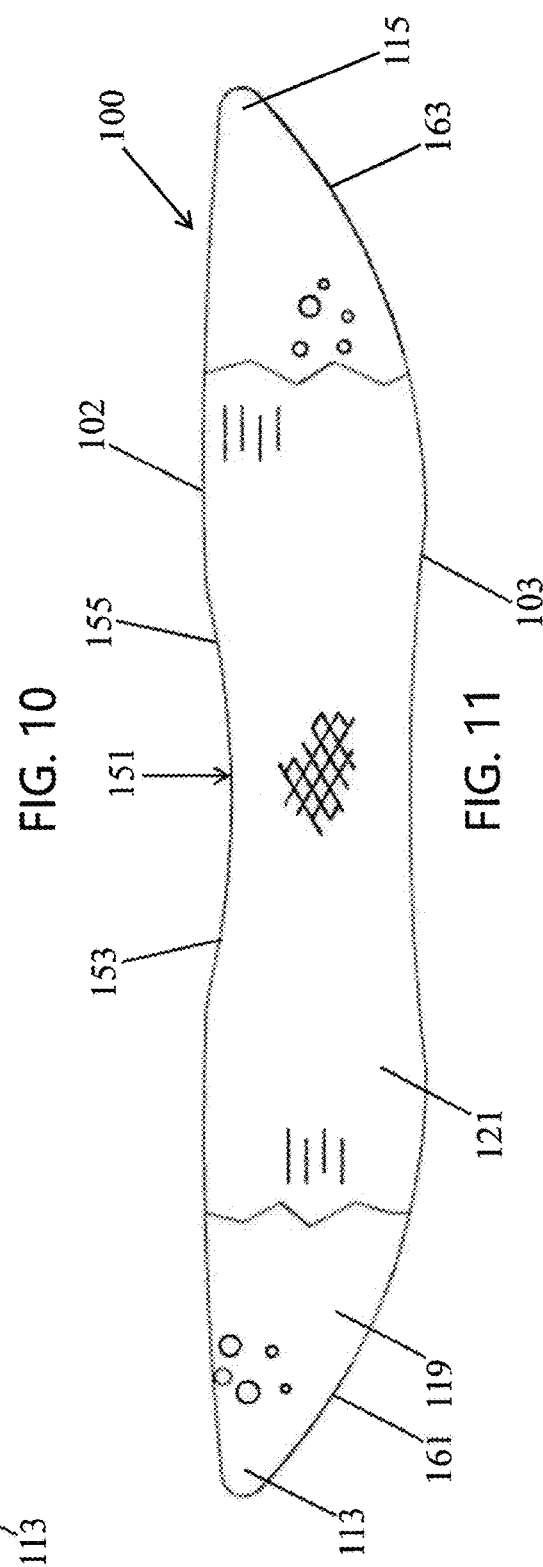

CONCRETE REPAIR DEVICE

The present application claims priority on U.S. Provisional Application Ser. Nos. 63/111,218 filed Nov. 9, 2020 and 63/158,923 filed Mar. 10, 2021, both of which are incorporated herein by reference.

The present application is a continuation-in-part of U.S. Design application Ser. Nos. 29/755,392 filed Oct. 20, 2020 and 29/773,597 filed Mar. 10, 2021, both of which are incorporated herein by reference.

The installation of fiber-reinforced polymer (FRP) in slots cut into concrete is a technique developed over the years by the concrete repair industry and has become the generally accepted way to repair pre-cast concrete double tee systems. The present disclosure is directed to a method and apparatus for strengthening concrete, more particularly directed to a method and apparatus for strengthening and/or repairing concrete connections, and still more particularly directed to a method and apparatus for connecting, strengthening and/or repairing the flange-to-flange connections for pre-cast and pre-stressed double tee systems.

BACKGROUND OF THE DISCLOSURE

Concrete structures are commonly used for buildings, parking garages, and the like. Over time, cracks can develop within concrete structures. If such cracks are left unrepaired, the cracks can result in failure of the structure. This is a particular problem for parking garages wherein large loads from vehicles travel daily over the concrete surface. To prevent the failure of the concrete structure without having to replace the entire structure, the damaged concrete structure is often repaired by cutting the damaged section away from a pre-existing concrete section, and then pouring new concrete into the cutout portion. However, new concrete does not always bond perfectly with the pre-existing concrete, thus resulting in the propagation of cracks in the joint between the old and new concrete.

Other methods have been used to repair damaged concrete structures and maintain the mechanical connection between the new concrete section and a pre-existing concrete section. One prior art repair method involves first removing the damaged concrete and then drilling holes in the pre-existing concrete using a rotary impact hammer drill. Thereafter, an adhesive is placed into the holes, and reinforcing bars are inserted such that the bars extend beyond the outer wall of the pre-existing concrete and are generally perpendicular to the joint between the pre-existing concrete section and the gap defining the area where the new concrete is to be poured. The new concrete is then poured adjacently to the pre-existing concrete such that the ends of the reinforcing bars extend into the new concrete and bond with the new concrete when the new concrete cures. As a result, when the new concrete cures, it will be joined to the pre-existing concrete via the reinforcing bars. When attaching external fixtures to pre-existing concrete sections, holes are commonly drilled using a standard rotary drill, and the anchors are either bonded or friction-fitted within the drilled holes. The external fixtures are then mounted onto the anchors.

Several disadvantages are associated with these past methods of repair and attachment of newly poured concrete. For instance, the drilling of multiple holes into the existing concrete is a slow and labor-intensive process. Additionally, the vibrations associated with the drilling of the holes can cause an entire section of concrete to fail. Moreover, once a hole is drilled, it must be subsequently cleaned of dust and concrete particles in order to permit the adhesive to properly bond to the concrete. Furthermore, cracks can form over time in the joint between the new concrete section and the pre-existing concrete. As such, when moisture seeps down these cracks, the metallic reinforcing bars will rust, corrode, and subsequently fail, thereby necessitating further repair of the concrete section. Also, a phenomenon known in the industry as "burping" may occur, whereby air pockets become trapped within the hole once the reinforcing bar is installed, thereby preventing at least a portion of the adhesive from bonding with the reinforcing bar. Such defective bonding can lead to premature failure of the reinforced joint.

The repair of concrete structures such as a parking garage structure, a concrete driveway, or the like that is disposed above T-shaped concrete beams can be problematic. The concrete structures are typically joined together by metal clips. As cracks form in the concrete structures, moisture seeps into the concrete supports and corrodes the metal clips. Such metal clip corrosion ultimately causes the metal clip to fail, which can result in the collapsing of a concrete slab within the parking garage. One prior art method to repair this type of damage involves welding or bolting a supplemental joining apparatus to both supports, thereby retaining them together. This method is expensive and labor intensive. Additionally, the repair is aesthetically unappealing. Another prior art method to repair this type of damage involves cutting through the concrete to access and replace the failed metal clip. Again, this process is labor intensive and expensive.

Another prior art method to repair concrete structures disposed above T-shaped concrete beams is disclosed in U.S. Pat. No. 6,312,541, which is incorporated herein by reference. The '541 patent discloses the use of a half-moon-shaped molded composite insert that is inserted into a cut slot in the concrete slab. The slot is cut generally perpendicular to the T-shaped concrete beams and across the gap between two concrete structures. An epoxy material is used to secure the composite insert in the cut slot. The composite insert includes a plurality of cavities that facilitate in the bonding of the composite insert within the cut slot in the concrete slab. Although the molded composite insert is an improvement over prior art methods to repair damaged concrete, there remains a continued need to improve the strength and durability of the repaired concrete.

Another prior art method to repair concrete structures disposed above T-shaped concrete beams is disclosed in U.S. Pat. No. 8,567,146, which is incorporated herein by reference. The '146 patent discloses a composite material for use in repairing concrete. A slot is cut into two adjacently positioned concrete slabs and the composite material is inserted into the cut and adhesively connected to the concrete slabs. Although the composite insert is an improvement over prior art methods to repair damaged concrete and/or to connect together adjacently positioned concrete slabs, there remains a continued need to improve the strength and durability of the repaired concrete and/or connected concrete and to reduce cracking in the repaired and/connected concrete.

SUMMARY OF THE DISCLOSURE

The present disclosure is directed to a method and apparatus for connecting, strengthening, and/or repairing concrete connections, and more particularly directed to a method and apparatus for connecting, strengthening, and/or repairing the flange-to-flange connections for pre-cast and pre-stressed double tee systems; however, it can be appreciated that the method can be used to connect other concrete systems and other non-concrete systems. The method of the present disclosure includes the use of an improved composite material bonded to a region of concrete. The method of the present disclosure is simple to implement, generally less expensive than welding or bolting a supplemental joining apparatus to the concrete, and only requires a small region about the concrete to be closed down for repair and/or connection, thus minimizing the need to close off the complete concrete structure during the repair and/or connection process.

In one non-limiting aspect of the present disclosure, the improved composite material includes a first fiber system that is partially or fully coated, partially or fully saturated, and/or partially or fully incorporated in a resin material. The improved composite material can be formed of a first fiber system, or can be formed of two or more fiber systems. The improved composite material is designed to resist tensile loading and simple shear to facilitate in the repair and/or connection of concrete.

In another and/or alternative non-limiting aspect of the present disclosure, the fibers used in the first fiber system can include one or more types of fibers (e.g., carbon fibers, glass fibers, aramid fibers [Kevlar®, Twaron®, etc.], boron fibers, hemp, basalt fibers, etc.). The first fiber system can include one or more layers of fibers. As such, the first fiber system can be formed of: 1) a single layer of fibers that are positioned fully parallel or substantially parallel to one another (0-10° [ and all values and ranges therebetween] deviation to one another), and which layer of fibers are optionally connected together by an arrangement other than an adhesive or other binding material (e.g., stitching, staples, melted bond, clips, pins, etc.); 2) a plurality of layers of fibers that are positioned fully parallel or substantially parallel to one another, and wherein the two or more layers of fibers are connected together by an arrangement other than an adhesive or other binding material (e.g., stitching, staples, melted bond, clips, pins, etc.); 3) a single layer of fiber rovings that are positioned fully parallel or substantially parallel to one another (0-10° [ and all values and ranges therebetween] deviation to one another), and which single layer of fiber rovings are optionally connected together by an arrangement other than an adhesive or other binding material (e.g., stitching, staples, melted bond, clips, pins, etc.); 4) two or more layers of fiber rovings, and wherein the two or more layers of fiber rovings are positioned fully parallel or substantially parallel to one another, and wherein the two or more layers of fiber rovings are optionally connected together by an arrangement other than an adhesive or other binding material (e.g., stitching, staples, melted bond, clips, pins, etc.); 5) two or more layers of fiber rovings that are positioned non-parallel to one another (e.g., 15°-165° [ and all values and ranges therebetween] deviation to one another, +45° to −45°, +30° to −30°, +60° to −60°, +15° to 75°), and optionally one or more layers of fiber rovings are positioned parallel to one or more other layers of fiber rovings, and wherein two or more layers of fiber rovings are optionally connected together by an arrangement other than an adhesive or other binding material (e.g., stitching, staples, melted bond, clips, pins, etc.); 6) a fabric material formed of two or more layers of woven fibers that are positioned non-parallel to one another (e.g., 15°-165° [ and all values and ranges therebetween] deviation to one another, +45° to −45°, +30° to −30°, +60° to −60°, +15° to 75°), and wherein the two or more layers of fabric are optionally connected together by an arrangement other than an adhesive or other binding material (e.g., stitching, staples, melted bond, clips, pins, etc.); 7) two or more layers of fabric material formed of two or more layers of woven fibers that are positioned non-parallel to one another, and wherein the two or more layers of fabric material are connected together by an arrangement other than an adhesive or other binding material (e.g., stitching, staples, heat/melted bond, clips, pins, etc.); or 8) one or more layers fabric material formed of two or more layers of woven fibers that are positioned non-parallel to one another, and wherein one or more layers of rovings or fibers are positioned on one or both sides of the one or more layers of fabric material, and wherein the two or more fabric layers (when used) are connected together by an arrangement other than an adhesive or other binding material (e.g., stitching, staples, melted bond, clips, pins, etc.), an wherein the one or more layers of fiber rovings or fibers are optionally connected to one or more other layers by an arrangement other than an adhesive or other binding material (e.g., stitching, staples, melted bond, clips, pins, etc.). After the first fiber system is formed, it can be optionally partially or fully saturated and/or infused with one or more binders (e.g., resin, adhesive, polymer, etc.).

In another and/or alternative non-limiting aspect of the present disclosure, the volume of fibers used for each fiber layer in the first fiber system can be the same or different. In one non-limiting design, the first fiber system includes three fiber layers, wherein the first and third fiber layers having over 60% (e.g., 60.0001-100% and all values and ranges therebetween) of the fibers running parallel to the longitudinal axis of the improved composite material, and the second fiber layer positioned between the first and third fiber layers has over 60% (e.g., 60.0001-100% and all values and ranges therebetween) of the fibers running non-parallel to the longitudinal axis of the improved composite material. In another non-limiting design, the first fiber system includes three layers, wherein the first and third fiber layers having over 60% (e.g., 60.0001%-100% and all values and ranges therebetween) of the fibers running parallel to the longitudinal axis of the improved composite material, and the second fiber layer positioned between the first and third fiber layers has over 60% (e.g., 60.0001-100% and all values and ranges therebetween) of the fibers running non-parallel to the longitudinal axis of the improved composite material, 20-50% (and all values and ranges therebetween) of the fibers of the second fiber layer are oriented at an angle of +15 to +75° (and all values and ranges therebetween) relative to the longitudinal axis of the improved composite material, 20-50% (and all values and ranges therebetween) of the fibers of the second layer oriented at an angle of −15 to −75° (and all values and ranges therebetween) relative to the longitudinal axis of the improved composite material. In another non-limiting design, the first fiber system includes three layers, the first and third layers formed of a carbon fiber material and having over 80% (e.g., 80.0001-100% and all values and ranges therebetween) of the fibers running parallel to the longitudinal axis of the improved composite material, and the second layer positioned between the first and third fiber layers having over 80% (e.g., 80.0001-100% and all values and ranges therebetween) carbon fibers, and the second fiber layer having over 80% (e.g., 80.0001-100% and all values and ranges therebetween) of the fibers running non-parallel to the longitudinal axis of the improved composite material.

In another and/or alternative non-limiting aspect of the present disclosure, the improved composite material can include a first fiber system having a tensile strength of at least about 50 KSI. The tensile strength is the maximum stress that the fiber system can withstand before failure of the fiber system. In one non-limiting aspect of this embodiment, the improved composite material includes a first fiber system having a tensile strength of about 50-800 KSI (and all values and ranges therebetween). In another non-limiting aspect of this embodiment, the improved composite material includes a first fiber system having a tensile strength of at least about 300 KSI. In another non-limiting aspect of this embodiment, the improved composite material includes a first fiber system having a tensile strength of at least about 350 KSI. In another non-limiting aspect of this embodiment, the improved composite material includes a first fiber system having a tensile strength of about 350-700 KSI. In another non-limiting aspect of this embodiment, the improved composite material includes a first fiber system having a tensile strength of about 400-675 KSI. In another and/or alternative non-limiting embodiment of the disclosure, the improved composite material can include a first fiber system having a tensile modulus of at least about 3 MSI. Tensile modulus is an indicator of the stiffness of the fiber. Tensile modulus is the applied stress on the fiber, based on force and cross-sectional area of the fiber, divided by the observed strain at such stress level. In one non-limiting aspect of this embodiment, the improved composite material includes a first fiber system having a tensile modulus of about 3-60 MSI (and all values and ranges therebetween). In another non-limiting aspect of this embodiment, the improved composite material includes a first fiber system having a tensile modulus of at least about 10 MSI. In another non-limiting aspect of this embodiment, the improved composite material includes a first fiber system having a tensile modulus of at least about 15 MSI. In another non-limiting aspect of this embodiment, the improved composite material includes a first fiber system having a tensile modulus of about 15-50 MSI. In another non-limiting aspect of this embodiment, the improved composite material includes a first fiber system having a tensile modulus of about 18-35 MSI. In one non-limiting example, the first fiber system has a tensile strength of about 400-640 KSI and a tensile modulus of about 25-40 MSI.

In another and/or alternative non-limiting aspect of the present disclosure, the first fiber system of the improved composite material has a thickness of at least 0.0005 in., and typically 0.0005-1 in. (and all values and ranges therebetween), and typically 0.03-0.5 in., and more typically 0.06-0.3 in.

In another and/or alternative non-limiting aspect of the present disclosure, the improved composite material includes a first fiber system formed of a plurality of fiber layers wherein the thickness of two or more of the fiber layers is optionally non-uniform. In one non-limiting embodiment, the one or more of the outer fiber layers of the improved composite material have a thickness that is less than the thickness of one or more of the fiber layers located between the outer fiber layers. In one non-limiting example, the one or more outer fiber layers of the improved composite material have a thickness of at least 0.005 in., and generally 0.005-0.2 in. (and all values and ranges therebetween), and typically 0.01-0.02 in. (e.g., 0.0125 in., etc.). The thickness of the outer layers can be substantially the same (e.g., ±0-15% of the thickness of one another and all values and ranges therebetween). In another non-limiting example, the one or more fiber layers located between the two outer layers have a thickness of at least 0.005 in., and generally 0.005-0.5 in. (and all values and ranges therebetween), and typically 0.01-0.34 in. (e.g., 0.035 in., 0.07 in., etc.). When the first fiber system includes three or more fiber layers, the thickness of the one or more of the fiber layers positioned between the outer fiber layers can optionally be greater than the thickness of the one or more outer fiber layer; however, this is not required. In one non limiting example, the outer layers of the first fiber system are at least 0.005 in., and generally 0.005-0.2 in. (and all values and ranges therebetween), and typically 0.01-0.125 in. (e.g., 0.035 in., etc.), and the thickness of one or more of the fiber layers located between the outer fiber layers is least 0.005 in., and generally 0.005-0.4 in. (and all values and ranges therebetween), and typically 0.1-0.22 in. (e.g., 0.07 in., etc.).

In another and/or alternative non-limiting aspect of the present disclosure, the improved composite material includes a first fiber system and optionally one or more additional fiber systems. The one or more optional additional fiber systems can be the same or similar to the first fiber system as discussed above. The first fiber system can be secured to at least one other fiber system by use of an adhesive (e.g., resin, etc.) such that the sides of the fiber systems facing one another are bonded together by the adhesive. The first fiber system can have the same or different composition, same or different number of layers, and/or same or different fiber orientation.

In another and/or alternative non-limiting aspect of the present disclosure, the improved composite material can include a resin material selected from vinyl ester resins, epoxy resins, polyester resins, acrylic resins, polyurethane resins, phenolic resins, alkyd resins, polycarbonate resins, polyamide resins, and/or silicone resins. In one non-limiting embodiment of the disclosure, the resin material includes a vinyl ester resin. In another non-limiting embodiment of the disclosure, the resin material includes an epoxy resin. Generally, the first fiber system is partially or fully impregnated and/or saturated with the resin material; however, this is not required.

In another and/or alternative non-limiting aspect of the present disclosure, the improved composite material optionally includes a first fiber system sandwiched between two outer layers of dielectric insulating material. As used herein, a dielectric insulating material is a material having low conductivity and which creates obstruction in the flow of current. As defined herein, a dielectric insulating material has an electrical conductivity of less than $5.5\times10^{-3}$ S/m, and typically, a dielectric insulating material has an electrical conductivity of less than $5.5\times10^{-6}$ S/m. Non-limiting examples of dielectric insulating material includes fiberglass fiber layers, Kevlar® fiber layers, resin material layers, etc. The first fiber system and the one or more layers of dielectric insulating material can include the same or different material. In one non-limiting embodiment of the disclosure, the improved composite material includes a first fiber system partially or fully impregnated with and/or saturated with one or more types of resin material, and each side of the improved composite material includes one or more layers of dielectric insulating material formed of a different material from the first fiber system. In one non-limiting example, the first fiber system is partially or fully impregnated with an adhesive (e.g., resin material, etc.), and the outer layer on both sides of the improved composite material includes a layer of dielectric insulating material having a different composition from at least one of the fiber layers of the first fiber system. In another non-limiting example, the improved composite material only incudes a first fiber system that is partially or fully impregnated with an adhesive (e.g., resin material, etc.), and the outer layer on both sides of the first fiber system includes a layer of dielectric insulating material having a different composition from at least one of the fiber layers of the first fiber system, and the adhesive that is used to partially or fully impregnate the first fiber system may or may not be of the same composition as the dielectric insulating material. In another non-limiting example, the first fiber system includes one or more fiber layers having an electrical conductivity of greater than 0.5 S/m. In another non-limiting example, the first fiber system includes one or more carbon fiber layers having an electrical conductivity of greater than 1 S/m. In another non-limiting example, the first fiber system includes one or more carbon fiber layers having an electrical conductivity of greater than 1 S/m, and the outer layer on both sides of the improved composite material includes a resin layer having an electrical conductivity of less than 0.1 S/m. The thickness of the dielectric insulating material when it forms the outer layer of the improved composite material is generally less than the thickness of the first fiber system; however, this is not required. In one non-limiting example, the thickness of the dielectric insulating material is at least 0.0001 in., generally 0.005-0.5 in. (and all values and ranges therebetween), and typically 0.01-0.34 in. (e.g., 0.035 in., 0.07 in., etc.). In one specific examples, the outer layers of the improved composite material are formed of a resin material that is a dielectric insulating material and wherein each layer of the resin material has a thickness of 0.01-0.1 in. (and all values and ranges therebetween), and wherein one or both layers of the resin material have a thickness less than the thickness of the first fiber system.

In another and/or alternative non-limiting aspect of the present disclosure, one or both of the outer layers of the improved composite material is optionally non-smooth to facilitate in securing the improved composite material to the adhesive (e.g., resin, etc.) used to secure the improved composite material in the slot in the concrete. The non-smooth surface on one or both of the outer layers can be formed by ridges, slots, pits, ribs, or other non-smooth texture. In one non-limiting embodiment, the non-smooth surface on one or both of the outer layers is formed by a plate or mold used to mold, stamp, or compress one or both of the outer layers partially or fully formed of an adhesive material (e.g., resin, etc.) to create the non-smooth surfaces on one or both of the outer layers of the improved composite material. Generally, the improved composite material does not include any openings or holes that detract from the strength of the improved composite material.

In another and/or alternative non-limiting aspect of the present disclosure, the improved composite material is optionally at least partially formed by partially or fully saturating and/or impregnating the first fiber system with an adhesive (e.g., resin material, etc.) and then pressing the one or more layer of the first fiber system together until the adhesive dries and/or cures. A vacuum can optionally be applied during the pressing and drying/curing steps. The process for forming the improved composite material can be by a batch process or a continuous process. The adhesive material can be pre-applied and/or applied as the one or more layers of the first fiber system are brought together.

In another and/or alternative non-limiting aspect of the present disclosure, the improved composite material has a certain size, shape, and thickness to achieve the desired repair and/or connection strength for the concrete. In one non-limiting embodiment of the disclosure, the longitudinal length of the improved composite material is 8-25 in. (and all values and ranges therebetween), and typically 12-18 in. When the length of the improved composite material is less than about eight in., the desired resistance to tensile loading and simple shear is generally not achieved. When the length of the improved composite material is greater than about 25 in., little (if any) improvement in resistance to tensile loading and simple shear is noticed. The height of the improved composite material is selected to be less than the thickness of the concrete being repaired and/or connected together; however, this is not required. In one non-limiting embodiment, the maximum height of the improved composite material is at least about 1.5 in. In one non-limiting aspect of this embodiment, the maximum height of the improved composite material is about 1.5-6 in. (and all values and ranges therebetween), and generally about 2-3.5 in. The width or thickness of the improved composite material is at least about 0.05 in. In one non-limiting aspect of this embodiment, the thickness of the improved composite material is about 0.05-0.5 in. (and all values and ranges therebetween), and generally about 0.1-0.3 in. The thickness of the improved composite material can be uniform or vary along the longitudinal length of the improved composite material.

In another and/or alternative non-limiting aspect of the present disclosure, the shape of the improved composite material is generally selected to fit within a cut slot in the concrete. In one non-limiting aspect of the disclosure, the two side profiles of the improved composite material along the longitudinal length of the improved composite material are in a generally parallel relationship to one another; however, this is not required. In one non-limiting embodiment, the thickness of the improved composite material along 50-100% (and all values and ranges therebetween) of the longitudinal length of the improved composite material is constant. In one non-limiting embodiment, the bottom surface of the improved composite material includes a curved portion or the full bottom surface is a curved surface. When only a portion of the bottom of the improved composite material includes a curved surface, generally about 20-99% (and all values and ranges therebetween) of the bottom surface includes a curved surface. The radius of curvature of the one or more curved surfaces on the bottom of the improved composite material is generally about 4-9 in. (and all values and ranges therebetween). In one non-limiting configuration, the middle portion of the bottom surface of the improved composite material is flat and the two side portions of the bottom surface are curved.

In another and/or alternative non-limiting aspect of the present disclosure, the improved composite material has curved ends. The radius of curvature of the curved ends is generally about 0.1-1 in. (and all values and ranges therebetween). The curved ends of the improved composite material reduce stress points at such region of the improved composite material which results in reduced cracking of the concrete at or near the ends of the improved composite material and/or reduces the incidence of the adhesive disengaging from the improved composite material and/or concrete at or near the ends of the improved composite material.

In another and/or alternative non-limiting aspect of the present disclosure, the improved composite material has a recessed portion in the upper region of the improved composite material. The recessed portion is generally located in the top middle region of the improved composite material. The recessed position is generally about 5-60% (and all values and ranges therebetween) the longitudinal length of the improved composite material, and generally about 20-40% the longitudinal length of the improved composite material. In one non-limiting example, when the longitudinal length of the improved composite material is about 12-18 in., the longitudinal length of the recessed portion is 2.4-7.2 in. The maximum depth of the recessed portion is about 5-50% (and all values and ranges therebetween) of the maximum height of the improved composite material, and generally about 10-30% of the maximum height of the improved composite material. In one non-limiting example, when the maximum height of the improved composite material is 2-4 in., the maximum depth of the recess portion is 0.2-1.2 in. The ends of the recessed portion can optionally include curved transitions. The curved transition (when used) can be a sinusoidal or wave-shaped transition; however, this is not required. The radius of curvature of the one or more curved transitions is generally about 0.2-2 in. (and all values and ranges therebetween), and generally 0.5-1.5 in. The recessed portion is formed in the improved composite material to improve the flexibility of the improved composite material along the longitudinal length of the improved composite material. Such increased flexibility has been found to reduce the incidence of stress cracks at or near the location of the secured improved composite material in the concrete without sacrificing the strength of connection formed by the improved composite material.

In another and/or alternative non-limiting aspect of the present disclosure, the improved composite material has a tensile strength along the x-y axis or longitudinal axis of at least about 50 KSI (e.g., 50-150 KSI and all values and ranges therebetween), a compressive strength along the x-y axis or longitudinal axis of at least about 40 KSI (e.g., 40-135 KSI and all values and ranges therebetween), a compressive strength through the z axis or thickness of at least about 5 KSI (e.g., 5-12 KSI and all values and ranges therebetween), a shear strength through the z axis or thickness of at least about 10 KSI (e.g., 10-30 KSI and all values and ranges therebetween), and/or an inter-laminar shear along the x-y axis or longitudinal axis of at least about 1 KSI (e.g., 1-3 KSI and all values and ranges therebetween).

In another and/or alternative non-limiting aspect of the present disclosure, the method for using the improved composite material includes the step of adhesively connecting the improved composite material to the concrete. Many different types of adhesives can be used. Generally, the adhesive is an epoxy adhesive; however, other or additional adhesives can be used. When an epoxy adhesive is used, the epoxy is generally a two-part, 100% solids epoxy that is thixotropic in nature. This type of adhesive bonds well to both the improved composite material and the concrete. However, other adhesives that include vinyl ester resins, polyester resins, acrylic resins, polyurethane resins, phenolic resins, alkyd resins, polycarbonate resins, polyamide resins, and/or silicone resins can also or alternatively be used. The curing time for the adhesive is generally about 1-5 hours, depending on the temperature. The bonding strength of the improved composite material to the concrete is at least about 1 KSI. In one embodiment of the disclosure, bonding strength of the adhesive to the concrete is 1-6 KSI (and all values and ranges therebetween). In another one non-limiting aspect of this embodiment, the bonding strength of the adhesive to the concrete is at least about 1.5 KSI. In another non-limiting aspect of this embodiment, the bonding strength of the adhesive to the concrete is at least about 1.8 KSI. In another non-limiting aspect of this embodiment, the bonding strength of the adhesive to the concrete is at least about 2 KSI. In another non-limiting aspect of this embodiment, the bonding strength of the adhesive to the concrete is about 2-5 KSI. In another non-limiting aspect of this embodiment, the bonding strength of the adhesive to the concrete is about 2.2-4 KSI. In another non-limiting aspect of this embodiment, the bonding strength of the adhesive to the concrete is about 2.4-3.2 KSI. The adhesive used to bond the improved composite material to the concrete can be the same or different from the adhesive or resin used to bond one or more fibers layers together in the improved composite material and/or to form the one or more outer layers of the improved composite material.

In another and/or alternative non-limiting aspect of the present disclosure, the method for using the improved composite material includes the step of cutting a slot into the concrete slab wherein the improved composite material can be fully or partially inserted into the cut slot. The size, length, and depth of the slot are selected to ensure that the improved composite material is properly inserted into the cut slot of the concrete. Generally, only one piece of improved composite material is placed in the cut slot; however, it can be appreciated that more than one piece of improved composite material can be placed into the cut slot. In one non-limiting embodiment of the disclosure, the slot width is at least about 100% the width or thickness of the improved composite material. The minimum slot width is selected to ensure that a sufficient amount of bonding material can be positioned between the improved composite material and the concrete. In addition, the slot width is not greater than about 500% the width or thickness of the improved composite material. A slot width that is too large will result in the improper bonding of the improved composite material to the concrete. A too large slot results in a thick adhesive layer which can result in the failure in the adhesive from shear prior to the composite fully engaging the forces being applied to the concrete. In one non-limiting aspect of this embodiment, the slot width in the concrete is about 100-500% (and all values and ranges therebetween) the width or thickness of the improved composite material, and generally 105-300% the width or thickness of the improved composite material. In another non-limiting aspect of this embodiment, the slot width in the concrete is about 110-250% the width or thickness of the improved composite material. The slot width may or may not be constant along the longitudinal length of the slot. It has been found that the wobble and variation of slot width can enhance the bond between the concrete and improved composite material by adding texture to the inside of the cut slot. In another non-limiting embodiment of the disclosure, the cut slot depth is at least about 100% of the depth or height of the improved composite material. The depth of the slot is limited by the thickness of the concrete. Generally, the cut slot should not be cut fully through the concrete. In one non-limiting aspect of this embodiment, the slot depth is about 100-300% (and all values and ranges therebetween) of the depth or height of the improved composite material, and typically the cut slot depth is 110-200% of the depth or height of the improved composite material. In another non-limiting aspect of this embodiment, the slot depth is about 120-180% (e.g., 140%, etc.) of the depth or height of the improved composite material. In another non-limiting aspect of this embodiment, the slot depth is at least about 0.1 in. (e.g., 0.1-0.5 in. and all values and ranges therebetween) less than the thickness of the concrete. Generally, the top of the improved composite material is placed below the top surface of the concrete when the improved composite material is inserted into the cut slot and the adhesive is generally placed around and over the top of the top of the improved composite material when the improved composite material is properly positioned in the cut slot. In still another non-limiting embodiment of the disclosure, the cut slot length generally is at least about 100% the longitudinal length of the improved composite material. In another non-limiting aspect of the present disclosure, the slot length is generally about 100-150% (and all values and ranges therebetween) the longitudinal length of the improved composite material, and typically the slot length is 101-115% the longitudinal length of the improved composite material.

In another and/or alternative non-limiting aspect of the present disclosure, the method for using the improved composite material includes the optional step of cutting a slot into one or more concrete structures or slabs at a nonparallel angle to form a nonparallel cut slot between the two concrete structures or slabs. Generally, in a structure such as, but not limited to, a parking garage, T-shaped beams (e.g., T-shaped concrete beams, etc.) are used to support a plurality of concrete structures or slabs. In such an arrangement, a gap exists between the two concrete structures or slabs. The cut slot of the present disclosure can optionally be cut at a nonparallel angle to such gap and also cut into the concrete structures or slabs positioned on both sides of the gap. The size, length, and depth of the cut slot are selected to ensure that the improved composite material is properly inserted into the cut slot of the concrete structure or slab. In one non-limiting embodiment of the disclosure, the angle of the cut slot relative to the gap between the two concrete structures or slabs is about 10-170° (and all values and ranges therebetween). In one non-limiting aspect of this embodiment, the angle of the cut slot relative to the gap between the two concrete structures or slabs is about 20-160°. In another non-limiting aspect of this embodiment, the angle of the cut slot relative to the gap between the two concrete structures or slabs is about 30-150°. In another non-limiting aspect of this embodiment, the angle of the cut slot relative to the gap between the two concrete structures or slabs is about 45-135°. It has been found that when the angle of the cut slot relative to the gap between the two concrete structures or slabs is about 45-135°, the full load transfer of the improved composite material to the concrete is obtained and a very high lateral shear in the joint is also obtained. The 45-135° angle allows the improved composite material to handle the forces in tension rather than through thickness shear. Generally, the cut slot is cut so that the cut slot is centered between the two concrete structures or slabs; however, this is not required. When more than one cut slot is cut into the two concrete structures or slabs, the cut slots can be cut in a parallel or nonparallel relationship to one another. In one non-limiting arrangement, two adjacent positioned cut slots are cut at +/−30-60°. Such alternating cut slots allow for the maximum tension transfer to the improved composite material in the cut slots.

In another and/or alternative non-limiting aspect of the present disclosure, non-fully dried and/or non-fully cured adhesive secures the improved composite material in the cut slot or opening in the concrete structure and generally fills the remaining void in the cut slot or opening after the improved composite material is inserted into the cut slot or opening. Prior to the non-fully dried and/or non-fully cured adhesive and/or the improved composite material being inserted into the slot or opening, the cut slot or opening is generally cleaned. The cut slot or opening can be cleaned by various means (e.g., pressurized air, water, cleaning solvent, etc.). In one arrangement, the cut slot or opening is cleaned with 30-150 psi or greater oil-free compressed air. In another non-limiting arrangement, non-fully dried and/or non-fully cured adhesive is optionally placed in the cut slot or opening prior to the improved composite material being inserted into the cut slot or opening. One or both sides of the improved composite material can be optionally coated with non-fully dried and/or non-fully cured adhesive prior to the improved composite material being inserted into the cut slot or opening. In one non-limiting arrangement, non-fully dried and/or non-fully cured adhesive is placed in the cut slot or opening prior to the improved composite material being inserted into the cut slot or opening and one or both sides of the improved composite material are coated with adhesive prior to the improved composite material being inserted into the cut slot or opening. When the improved composite material includes an adhesive (e.g., resin material, etc.) to at least partially form the improved composite material, the adhesive is generally fully dried and/or fully cured prior to 1) the improved composite material being coated on one or both sides with a non-fully dried and/or non-fully cured adhesive prior to the improved composite material being inserted into the cut slot or opening, and/or 2) the improved composite material being inserted into the cut slot or opening. As such, the improved composite material is a generally fully formed and includes a fully dried or cured adhesive prior to use.

In still yet another and/or alternative non-limiting aspect of the present disclosure, when more than one portion of a concrete structure is to be connected, strengthened, and/or repaired by the improved composite material, the slot angles of the multiple cut slots can be selected to improve the strength of the connected and/or repaired region; however, this is not required. In one non-limiting embodiment of the disclosure, a plurality of cut slots are cut in the concrete structure at an angle generally parallel to one another. In another non-limiting embodiment of the disclosure, a plurality of cut slots are cut in the concrete structure at an angle that is negative to the angle of another cut slot (e.g., +30° to −30°, +45° to −45°, +60° to −60°, etc.).

In another and/or alternative non-limiting aspect of the present disclosure, there is provided a novel method for repairing and/or connecting one or more concrete structures or slabs. Such concrete structures or slabs can optionally be supported relative to one another such as by, but not limited to, T-shaped beams, etc. The basic steps for the novel method are as follows: 1) cutting a slot into the adjacently positioned concrete structures or slabs such that the cut slot crosses a portion of the region of the two adjacently positioned concrete structures, 2) inserting the improved composite material into the cut slot such that the improved composite material spans across the gap between the adjacently positioned concrete structures or slabs, and 3) securing the improved composite material in the cut slot. Generally, the improved composite material is fully formed and includes a fully dried or cured adhesive prior to being inserted into the cut slot. When the improved composite material is partially formed of an adhesive, the adhesive used to partially form the improved composite material can be the same or different from the adhesive used to secure the improved composite material in the cut slot.

In another and/or alternative non-limiting aspect of the present disclosure, the novel method for connecting, strengthening, and/or repairing one or more concrete structures or slabs can optionally include additional steps. Such additional steps include, but are not limited to, a) cutting the cut slot into the adjacently positioned concrete structures or slabs such that each concrete structure or slab has generally the same slot length, slot width, slot depth, and/or slot profile, b) cutting the cut slot into the adjacently positioned concrete structures or slabs at a particular angle relative to the gap between the adjacently positioned concrete structures or slabs, c) cleaning the cut slot prior to inserting the improved composite material into the cut slot, d) cleaning the cut slot prior to inserting non-fully dried and/or non-fully cured adhesive into the cut slot, e) using a particular length, thickness, vertical width, shape, and/or composition for the improved composite material for use in the cut slot, f) placing masking about the cut slot to inhibit or prevent adhesive from contacting the top surface of the concrete that is located adjacent to the cut slot, g) inserting a non-fully dried and/or non-fully cured adhesive into one or more portions of the cut slot prior to inserting the improved composite material into the cut slot, h) applying a non-fully dried and/or non-fully cured adhesive and/or primer to one or more outer surfaces of the improved composite material prior to inserting the improved composite material into the cut slot, i) inserting the improved composite material into the cut slot until the top edge of the improved composite material is positioned below the top surface of the concrete that is located adjacent to the cut slot, j) applying a non-fully dried and/or non-fully cured adhesive into the cut slot after the improved composite material has been inserted into the cut slot to fill the cut slot with such adhesive, k) applying a non-fully dried and/or non-fully cured adhesive on the top surface of the concrete located adjacent to the cut slot and over the top edge of the improved composite material located in the cut slot, l) removing any damaged concrete about or adjacent to the cut slot and replacing the damaged concrete with new concrete and/or durable polymer material (e.g., epoxy, etc.), m) cutting the cut slot through a damaged region of concrete so the improved composite material facilitates in securing the new concrete and/or durable polymer material in the region from which the damaged concrete form was removed and replaced with new concrete and/or durable polymer material new concrete and/or durable polymer material, and/or n) alternating the cut slot angle of multiple cut slots in the concrete structure. As can be appreciated, one or more of the above listed additional steps can be used in the method of the present disclosure. Also, it will be appreciated that any combination of the above listed additional steps can be used in the method of the present disclosure. Lastly, it can be appreciated that all of the above listed additional steps can be used in the method of the present disclosure.

The improved composite material has several advantages, namely:

- The shape of the improved composite material has two parallel sides extending for a sufficient distance so enough of the cut sections of the two concrete sections can be bonded to the improved composite material.
- The orientation of the fibers in the improved composite material provide for greater strength to the improved composite material and the connection formed by the improved composite material.
- The improved composite material does not need to be placed through a metal clip to connect together two T-shaped planks.
- The improved composite material has no holes or slots through the body of the improved composite material that would compromise the strength of the improved composite material.
- Less adhesive is potentially required to secure the improved composite material in a cut slot in the concrete.
- The improved composite material has improved tensile capacity, compressive capacity, shear capacity, and/or flexibility.
- The improved composite material is versatile and can be used in many different concrete repairs and/or connection applications.
- The improved composite material is designed to adequately engage the tee beam system with enough area to form a desired bond with the desired strength.
- The improved composite material is configured to better fit into a cut slot in the concrete.
- The improved composite material reduces stress cracks that form near the ends or nose of the improved composite material when connected in the cut slot.
- The improved composite material has improved linear flexibility along the longitudinal length of the improved composite material.
- The improved composite material reduces cracking of the concrete as a result of negative moment of the tees.
- The improved composite material allows for increased vertical bending.
- The improved composite material reduces stress in the concrete at the ends or nose of the improved composite material during reverse bending and vertical shearing of the connected concrete.
- The improved composite material allows for depression of a backer rod and adhesive into the cut slot after the improved composite material has been fully inserted into the cut slot.
- The improved composite material in the new thinner decks can be installed without cutting through the bottom of the deck.
- The improved composite material is shaped to better fit the 14" blade curve in the cut slot.
- The improved composite material is absent sharp corners to avoid stress concentration in the concrete near the repair/connection region.
- The recess portion in the in the top center of the improved composited material allows installation/removal of the joint sealer between the tees.
- The improved composite material reduces the incidence of pop-out of the adhesive on the top of the improved composite material by allowing a thicker coating of adhesive to be placed on the top edge of the improved composite material when the improved composite material is inserted and secured in the cut slot.
- The improved composite material meets or exceeds all currently published ACI, PCI, and Biscuit® design requirements and specifications.
- The improved composite material increases vertical bending capacity by at least 330% over current biscuit configurations.
- The improved composite material significantly reduces stress in concrete at the nose of a flange during reverse bending and vertical shearing.
- The improved composite material allows for installation in all currently produced Double Tee thicknesses.
- The improved composite material allows for depression of joint sealant and backer rod.

It is one non-limiting object of the present disclosure to provide a method and apparatus for connecting, strengthening and/or repairing concrete that is less labor intensive than previous repair systems.

It is another and/or alternative non-limiting object of the present disclosure to provide a method and apparatus for connecting, strengthening, and/or repairing concrete that will not corrode over time.

It is another and/or alternative non-limiting object of the present disclosure to provide a method and apparatus for connecting, strengthening, and/or repairing concrete that reduces the incidence of cracking at or near the concrete connection location.

It is another and/or alternative non-limiting object of the present disclosure to provide a method and apparatus for connecting, strengthening, and/or repairing concrete that includes the use of an improved composite material.

It is another and/or alternative non-limiting object of the present disclosure to provide a method and apparatus for connecting, strengthening, and/or repairing concrete that minimizes the risk of damaging pre-existing concrete during the repair process.

It is another and/or alternative non-limiting object of the present disclosure to provide a method and apparatus for connecting, strengthening, and/or repairing two adjacent pre-existing sections of concrete.

It is another and/or alternative non-limiting object of the present disclosure to provide an improved composite material for use in connecting, strengthening, and/or repairing two adjacent pre-existing sections of concrete comprising a first fiber system and an adhesive, and wherein the improved composite material has a top edge, a bottom edge, a first end, a second end, a front face, a back face, a length, a width and a depth, and wherein at least one of the first and second ends optionally includes a curved surface between said top and bottom edges, and wherein said top edge includes a recess portion positioned between said first and second ends, and wherein the first fiber system includes one or more layers of fiber, and wherein said adhesive is optionally at least partially coated on and/or at least partially impregnated in said first fiber layer.

It is another and/or alternative non-limiting object of the present disclosure to provide an improved composite material for use in connecting, strengthening, and/or repairing two adjacent pre-existing sections of concrete wherein the first fiber system includes one or more fiber layers.

It is another and/or alternative non-limiting object of the present disclosure to provide an improved composite material for use in connecting, strengthening, and/or repairing two adjacent pre-existing sections of concrete, and wherein said first fiber system includes one or more fiber layers, low electrically-conducing outer layers are formed on the outer surfaces of the improved composite material.

It is another and/or alternative non-limiting object of the present disclosure to provide an improved composite material for use in connecting, strengthening, and/or repairing two adjacent pre-existing sections of concrete, and wherein said first fiber system includes one or more fiber layers, and wherein the fiber layers have the same composition, the same thickness, the same shape, the same configuration, and/or the same fiber orientation.

It is another and/or alternative non-limiting object of the present disclosure to provide an improved composite material for use in connecting, strengthening, and/or repairing two adjacent pre-existing sections of concrete wherein the recessed portion has a longitudinal length less than 50% a longitudinal length of the improved composite material.

It is another and/or alternative non-limiting object of the present disclosure to provide an improved composite material for use in connecting, strengthening, and/or repairing two adjacent pre-existing sections of concrete wherein the recess portion has a depth that is less than 50% the maximum height of the improved composite material.

It is another and/or alternative non-limiting object of the present disclosure to provide an improved composite material for use in connecting, strengthening, and/or repairing two adjacent pre-existing sections of concrete wherein the first and/or second ends are rounded.

It is another and/or alternative non-limiting object of the present disclosure to provide an improved composite material for use in connecting, strengthening, and/or repairing two adjacent pre-existing sections of concrete wherein the bottom edge has an improved profile that better fits into a cut slot in the concrete.

It is another and/or alternative non-limiting object of the present disclosure to provide an improved composite material for use in connecting, strengthening, and/or repairing two adjacent pre-existing sections of concrete wherein the adhesive secures the first fiber system to the concrete.

It is another and/or alternative non-limiting object of the present disclosure to provide an improved composite material for use in connecting, strengthening, and/or repairing two adjacent pre-existing sections of concrete wherein low electrically-conducing outer layers are formed on the outer surfaces of the improved composite material.

It is another and/or alternative non-limiting object of the present disclosure to provide an improved composite material for use in connecting, strengthening, and/or repairing two adjacent pre-existing sections of concrete wherein low electrically-conducing outer layers are formed on the outer surfaces of the improved composite material.

It is another and/or alternative non-limiting object of the present disclosure to provide an improved composite material for use in connecting, strengthening, and/or repairing two adjacent pre-existing sections of concrete wherein low electrically-conducing outer layers are formed on the outer surfaces of the improved composite material, and wherein the outer layers are formed of a different material from the fiber layers of the first fiber system.

It is another and/or alternative non-limiting object of the present disclosure to provide an improved composite material for use in connecting, strengthening, and/or repairing two adjacent pre-existing sections of concrete wherein the first and second ends of the first fiber system includes a curved surface between the top and bottom edges.

It is another and/or alternative non-limiting object of the present disclosure to provide an improved composite material for use in connecting, strengthening, and/or repairing two adjacent pre-existing sections of concrete wherein the curved surfaces of the first and second ends of the first fiber system have the same radius of curvature.

It is another and/or alternative non-limiting object of the present disclosure to provide an improved composite material for use in connecting, strengthening, and/or repairing two adjacent pre-existing sections of concrete wherein the first fiber system includes fibers selected from the group consisting of carbon fibers, glass fibers, aramid fibers, boron fibers, and basalt fibers.

It is another and/or alternative non-limiting object of the present disclosure to provide an improved composite material for use in connecting, strengthening, and/or repairing two adjacent pre-existing sections of concrete wherein the improved composite material has no openings through the front and back face.

It is another and/or alternative non-limiting object of the present disclosure to provide a method for connecting, strengthening and/or repairing a longitudinal axis of a concrete structure comprising: a) providing an improved composite material comprising a first fiber system and an adhesive, and wherein the improved composite material has a top edge, a bottom edge, a first end, a second end, a front face, a back face, a length, a width and a depth, and wherein at least one of the first and second ends includes a curved surface between said top and bottom edges, and wherein said top edge includes a recess portion positioned between said first and second ends, and wherein the first fiber system includes a first fiber layer, said first fiber layer including a plurality of fibers, and wherein said adhesive at least partially coated on and/or at least partially impregnated in said first fiber layer; b) cutting a slot in the concrete, wherein the cut slot intersects and crosses the longitudinal axis of the gap; c) inserting the improved composite material in the cut slot; and, d) inserting an adhesive in the cut slot to secure the improved composite material in the cut slot.

It is another and/or alternative non-limiting object of the present disclosure to provide a method for connecting, strengthening, and/or repairing a longitudinal axis of a concrete structure wherein the cut slot is cut at an angle of about 15-165° relative to a longitudinal axis of the gap, and wherein the cut slot has a longitudinal axis that is non-parallel to the longitudinal axis of the gap.

It is another and/or alternative non-limiting object of the present disclosure to provide a method for connecting, strengthening, and/or repairing a longitudinal axis of a concrete structure wherein about 30-70% of a longitudinal length of the improved composite material is positioned on one side of the gap between the two adjacently positioned concrete slabs and a remainder of the longitudinal length of the improved composite material is positioned on the other side of the gap.

It is another and/or alternative non-limiting object of the present disclosure to provide a method for connecting, strengthening, and/or repairing a longitudinal axis of a concrete structure wherein at least one of the first and second ends includes a curved surface between the top and bottom edges, and wherein a majority of the top edge is generally parallel to the bottom edge, and wherein the top edge has a longitudinal length that is greater than a longitudinal length of the bottom edge, a majority of the bottom edge is generally parallel to the top edge.

It is another and/or alternative non-limiting object of the present disclosure to provide a method for connecting, strengthening, and/or repairing a longitudinal axis of a concrete structure wherein the first fiber system includes fibers selected from the group consisting of carbon fibers, glass fibers, aramid fibers, boron fibers, and basalt fibers.

It is another and/or alternative non-limiting object of the present disclosure to provide a method for connecting, strengthening, and/or repairing a longitudinal axis of a concrete structure wherein the improved composite material has no openings through the front and back face.

It is another and/or alternative non-limiting object of the present disclosure to provide a method for connecting, strengthening and/or repairing a longitudinal axis of a concrete structure wherein the cut slot is cut at an angle of about 15-165° relative to the longitudinal axis of the gap.

These and other objects and advantages will become apparent to those skilled in the art upon reading and following the description taken together with the accompanying drawings.

BRIEF DESCRIPTION OF THE DRAWINGS

Reference may now be made to the drawings which illustrate various non-limiting embodiments that the disclosure may take in physical form and in certain parts and arrangement of parts wherein:

FIG. 1 is a fragmentary perspective view in cross-section of two pre-existing sections of concrete to be joined by a prior art concrete insert;

FIG. 2 is a sectional side elevation view of the pre-existing sections of FIG. 1 joined by the prior art concrete insert;

FIG. 5 is a cross-sectional view of FIG. 4;

FIG. 5A is a cross-sectional view of FIG. 4A;

FIG. 9 is a side view of the second version of the improved composite material that illustrates dimensions of the improved composite material;

FIG. 10 is a top elevation view of the first version of the improved composite material of the present disclosure;

FIG. 11 is a cross-sectional view of FIG. 10;

DETAILED DESCRIPTION OF THE NON-LIMITING EMBODIMENTS

Figure 3:
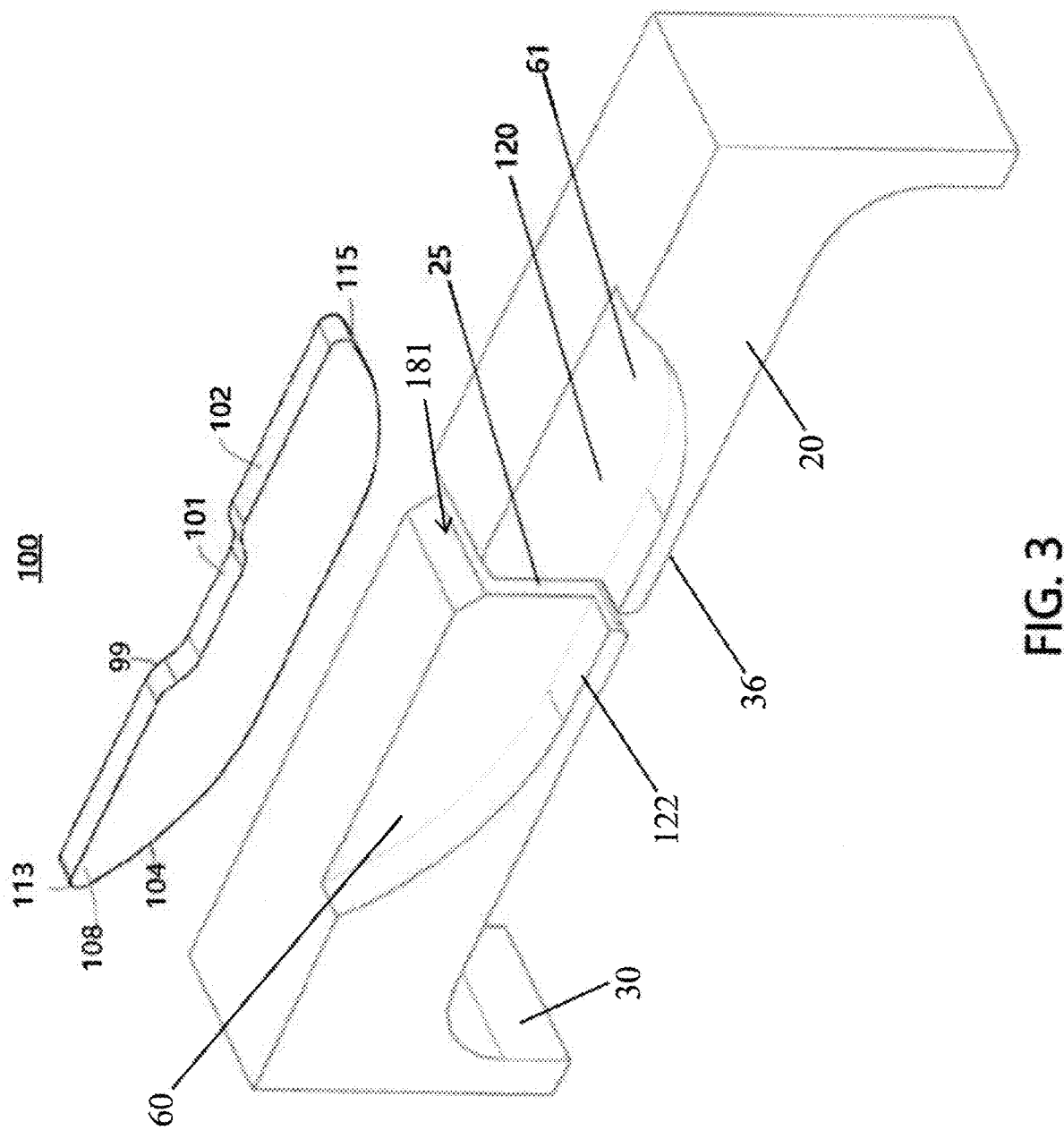
FIG. 3 is a fragmentary perspective view in cross-section of two pre-existing sections of concrete to be joined by the improved composite material in accordance with the present disclosure.

A more complete understanding of the articles/devices, processes, and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 10% of the indicated number.

Referring now to the drawings wherein the showings are for the purpose of illustrating non-limiting embodiments of the disclosure only and not for the purpose of limiting same, FIGS. 1 and 2 illustrate a typical concrete deck 20 that is disposed above concrete T-shaped planks 30. A prior art concrete insert 40 as disclosed in U.S. Pat. No. 6,312,541 is illustrated as forming a repair to the damaged concrete deck. The concrete deck is also illustrated as supported by metal clips 50 that join together the concrete T-shaped planks 30. The concrete insert 40 is designed to repair the metal clips 50 that have failed as a result of corrosion from moisture that has seeped into cracks 22 that have formed in concrete deck 20. The concrete insert 40 is illustrated as a relatively thin, elongated oblong-shaped structure having first and second major surfaces 42 and 43, a flat top 45, and an arcuate side or edge 44. Edge 44 is curved. The peripheral shape of edge 44 at least approximates the shape of slot 60. The major surfaces 42 and 43 of the concrete insert can be textured to improve bonding of the concrete insert with epoxy 70. The texturing may take the form of ridges, dimples, or any other rough or uneven surface topography. The concrete insert 40 can have interior walls 46 that define cavities 47 formed in the major surfaces 42 and 43 extending into, and typically through, the concrete insert to allow the epoxy 70 to flow into the cavities 47 and bond to the concrete insert, as illustrated in FIG. 2. The cavities 47 may be one of any size and shape as long as they function to increase bonding of the epoxy 70 to the concrete insert without unduly reducing the strength of the concrete insert. The concrete insert is typically formed from a corrosion-resistant composite material. Any material that resists corrosion and is capable of bonding to both adhesives and concrete could be used such as a molded thermoplastic material reinforced with fibers of glass, carbon, or the like. When concrete insert 40 is molded, the major surfaces 42 and 43 can be textured where the embedded fibers within the concrete insert form ridges in the major surfaces. Additionally, the mold may comprise indentations, thereby forming dimples on the exterior of the concrete insert during the molding process.

FIG. 1 illustrates that T-shaped planks 30 are rejoined by forming a slot 60 in the concrete deck 20, through metal clip 50, and partially into the T-shaped planks 30. A circular diamond saw blade is used to form slot 60. Epoxy 70 is inserted into slot 60 and then the concrete insert 40 is inserted into the slot. When the epoxy dries, the epoxy bonds the concrete insert to the concrete T-shaped planks 30 and the concrete deck 20, thereby retaining the concrete T-shaped planks in place relative to each other.

The improved composite material 100 of the present disclosure and method for inserting the improved composite material into concrete in accordance with the present disclosure is an improvement over the concrete insert 40 illustrated in FIGS. 1 and 2 and disclosed in U.S. Pat. No. 6,312,541, which is fully incorporated herein by reference, and also is an improvement over the insert 80 illustrated in FIG. 13.

FIGS. 3-12 illustrate two non-limiting versions of the improved composite material 100 in accordance with the present disclosure that are used to connect, strengthen, and/or repair a typical concrete deck 20 that is disposed above concrete T-shaped planks 30. FIG. 3 does not illustrate a metal clip 50 spanning a gap 25 between two T-shaped planks 30. In practice, the metal clips are spaced apart from one another along the longitudinal length or axis G of gap 25. As mentioned above, the metal clips secure together the two adjacently positioned T-shaped planks 30. FIG. 3 illustrates a tooled joint or gap 25 formed in the concrete deck 20. The tooled joint typically includes a sealant on the top portion of the tooled joint that covers a gap 25 between the two sections of the concrete deck; however, this is not required. Over time, moisture leaks through sealant and into gap 25, thereby resulting in moisture contacting a metal clip (not shown) and causing the metal clip to corrode, thereby compromising the structural strength of the metal clip.

The first and second improved composite materials 100 of the present disclosure are configured to quickly, easily, and effectively connect, strengthen, and/or repair the damaged connection between the two adjacently positioned T-shaped planks. As also can be appreciated, the improved composite materials of the present disclosure can be used in other concrete connection and/or repair applications. As also can be appreciated, the improved composite materials of the present disclosure can be used as a substitute for metal clips previously used to connect two adjacently positioned T-shaped planks. As such, originally installed T-shaped planks can eliminate the use of metal clips that corrode over time and be substituted for the improved composite materials of the present disclosure. When originally installed T-shaped planks use the improved composite materials of the present disclosure, the improved composite materials can be installed by the same or similar process (as will be discussed below) when repairing damaged metal clips between T-shaped planks, or the concrete on the T-shaped planks. and/or concrete slabs can include pre-cut or pre-formed slots for the improved composite materials of the present disclosure.

Figure 4:
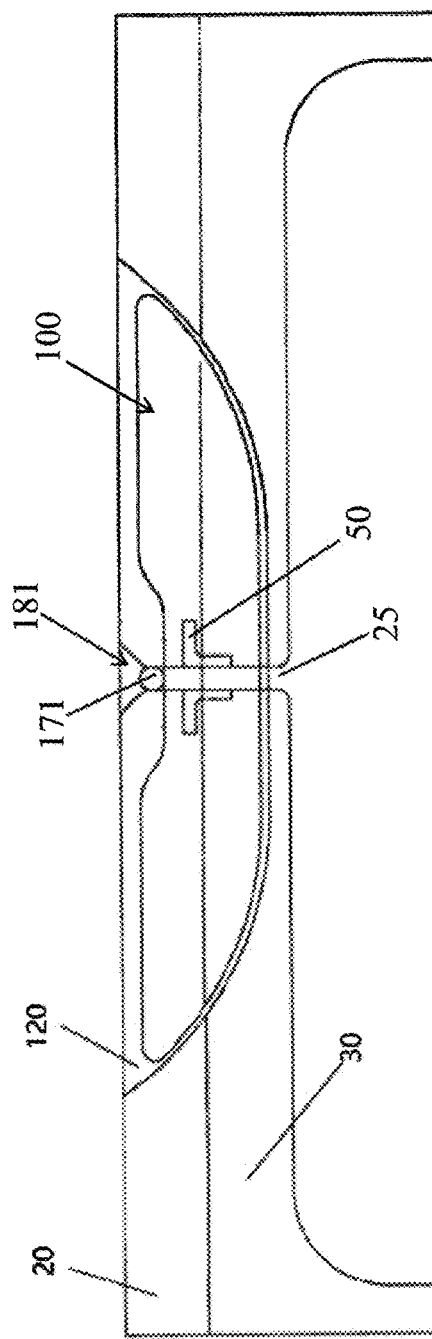
FIG. 4 is a sectional side elevation view of the pre-existing sections of concrete of FIG. 3 joined by the first version of the improved composite material of the present disclosure.
Figure 4A:
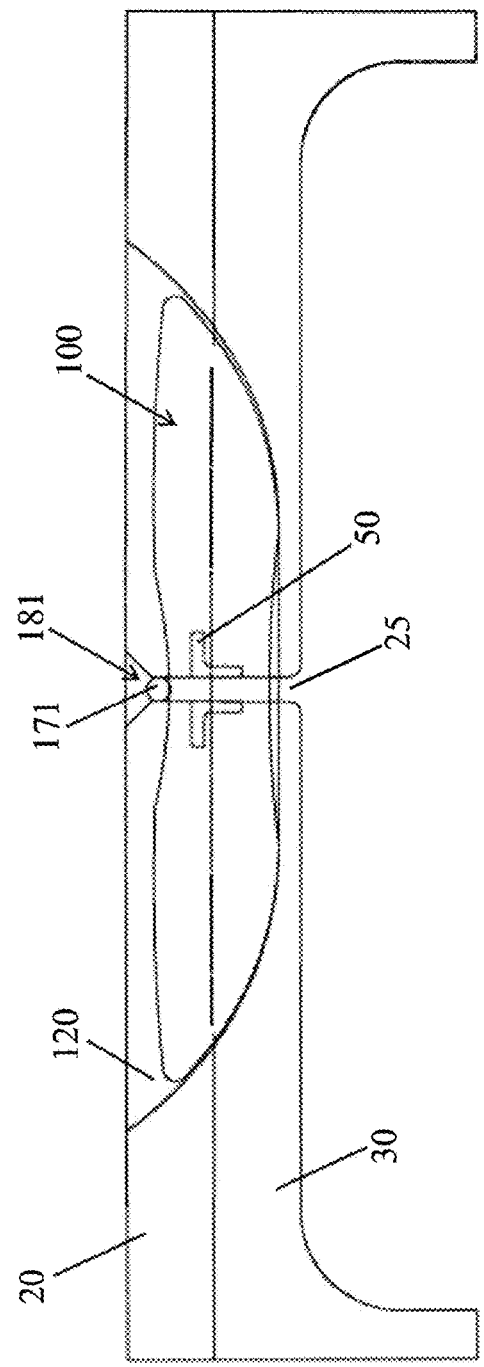
FIG. 4A is a sectional side elevation view of the pre-existing sections of concrete of FIG. 3 joined by the second version of the improved composite material of the present disclosure.

Referring now to FIGS. 3-4A, there is illustrated a concrete deck 20. A cut slot 120 is cut into the concrete deck 20. Generally, the slot depth is greater than the thickness of the concrete deck 20 such that the slot depth fully penetrates through the complete thickness of the concrete deck 20 and only partially into the T-shaped planks 30 as illustrated in FIGS. 4 and 4A; however, this is not required. When the cut slot 120 is not fully cut through the complete thickness or width of the top portion of the T-shaped planks, the base 122 of cut slot 120 is generally spaced at least about 0.1 in. from the bottom surface 36 of the top portions of the T-shaped planks, typically spaced about 0.1-5 in. (and all values and ranges therebetween) from the bottom surface of the top portions of the T-shaped planks, more typically spaced about 0.1-2 in. from the bottom surface of the top portions of the T-shaped planks. Depending on the location of the cut slot 120, the cut slot may or may not be cut through a pre-existing metal clip. In practice, the cut slot is cut in a location that does not include the metal clip since the metal clip can damage the cutting blade and/or increase cutting time for the slot when the blade contacts the metal clip; however, this is not required.

Cut slot 120 is generally cut by a saw blade (e.g., diamond tipped saw blade, etc.); however, the cut slot can be cut by other means. When the cut slot is cut by a circular saw blade, the two ends 60, 61 of the cut slot have a radius of curvature generally equal to the radius of curvature of the saw blade. As illustrated in FIGS. 3-5A, the cut slot is cut in the concrete deck 20 such that the longitudinal length or axis of the slot traverses gap 25. As illustrated in FIGS. 3-4A, the cut slot is generally symmetrically oriented about gap 25; however, this is not required. The cut slot is cut generally straight along the longitudinal length of the cut slot; however, this is not required. The inside surfaces of the cut slot can be smooth or non-smooth. Generally, the inside surface of the cut slot is non-smooth to facilitate in the bonding of the improved composite material 100 in the slot. The longitudinal length of the cut slot is generally equal to or greater than the longitudinal length of the improved composite material. Typically, the longitudinal length of the slot is at least about 102% the longitudinal length of the improved composite material, and typically 110-130% the longitudinal length of the improved composite material.

Cut slot 120 is also cut at a nonparallel angle to longitudinal length or axis of gap 25. As illustrated in FIGS. 3-4A, the longitudinal length or axis of the cut slot 120 is cut at an angle relative to the longitudinal length or axis of gap 25. Generally, the longitudinal length or axis of the cut slot is cut at an angle of about 10-170° to the longitudinal length or axis of the gap, typically at an angle of about 20-160°, more typically about 30-150°, and even more typically about 45-135° (e.g., 90°).

The width of the cut slot is generally uniform along the longitudinal length of the slot; however, this is not required. As illustrated in FIGS. 5 and 5A, the depth and width of the slot is greater than the depth and width of the improved composite material so the improved composite material can be easily inserted into the cut slot and an adhesive 70 can also be inserted into the cut slot to bond the improved composite material to the wall of the cut slot. Generally, the cut slot width in the concrete is about 105-200% (and all values and ranges therebetween) the width of the improved composite material, typically about 110-250% the width of the improved composite material, and even more typically about 150-200% the width of the improved composite material. The cut slot width may or may not be constant along the longitudinal length of the cut slot.

FIGS. 3-4A illustrate that the depth of cut slot 120 is generally uniform, excluding the curved slot ends; however, this is not required. FIGS. 4 and 4A also illustrate that the depth of cut slot 120 is greater than the depth or height of the improved composite material; however, this is not required. Generally, the depth of cut slot is generally at least 100% the depth or height of the improved composite material, typically about 100-200% (and all values and ranges therebetween) the depth or height of the improved composite material, more typically about 105-150% the depth or height of the improved composite material, and even more typically about 10%-125% the depth or height of the improved composite material. As illustrated in FIGS. 4 and 4A, when the depth or height of the improved composite material is less than the depth of the cut slot, the top surface of the improved composite material is positioned below the top surface of the concrete deck 20. In such an arrangement, adhesive 70 can be positioned completely about the outer surfaces (e.g., top, bottom and side surfaces) of the improved composite material. The adhesive is generally a two-part, 100% solids epoxy adhesive that is thixotropic in nature; however, other or additional types of adhesives can be used. The adhesive can be fully or partially inserted into the cut slot before, during, or after the improved composite material is inserted into the cut slot. The viscosity of the adhesive is generally selected to be easily poured and/or packed into the cut slot; however, this is not required. Adhesives having viscosities that are too large to allow the flow of the adhesive into the cut slot can result in the improper bonding of the improved composite material in the cut slot.

The adhesive is inserted into the cut slot prior to the full drying or curing of the adhesive. Generally, the 80%+ (e.g., 80-100% and all values and ranges therebetween) drying and/or curing time for the adhesive after the improved composite material is inserted into the cut slot and the adhesive is properly positioned in the cut slot to secure the improved composite material in the cut slot is at least about 0.25 hours, typically about 0.25-10 hours (and all values and ranges therebetween), and more typically about 1-5 hours. The bonding strength of the improved composite material to the concrete is generally about 1.5-4 MSI (and all values and ranges therebetween).

As illustrated in FIGS. 4-4A, the improved composite material is positioned in the cut slot so that it is generally symmetrically oriented (40-50 to 40-50%) about the longitudinal axis of gap 25; however, this is not required. Generally, the improved composite material is positioned in the cut slot so that about 30-70% (and all values and ranges therebetween) of the improved composite material is positioned on one side of the longitudinal axis of gap 25 and the remainder of the improved composite material on the other side of the longitudinal axis of the gap.

Referring now to FIGS. 5-11, the first and second versions of the improved composite material 100 are illustrated as formed of multiple layers. As can be appreciated, improved composite material 100 can be formed of a single layer of fiber that is coated and/or saturated with an adhesive.

Figure 6:
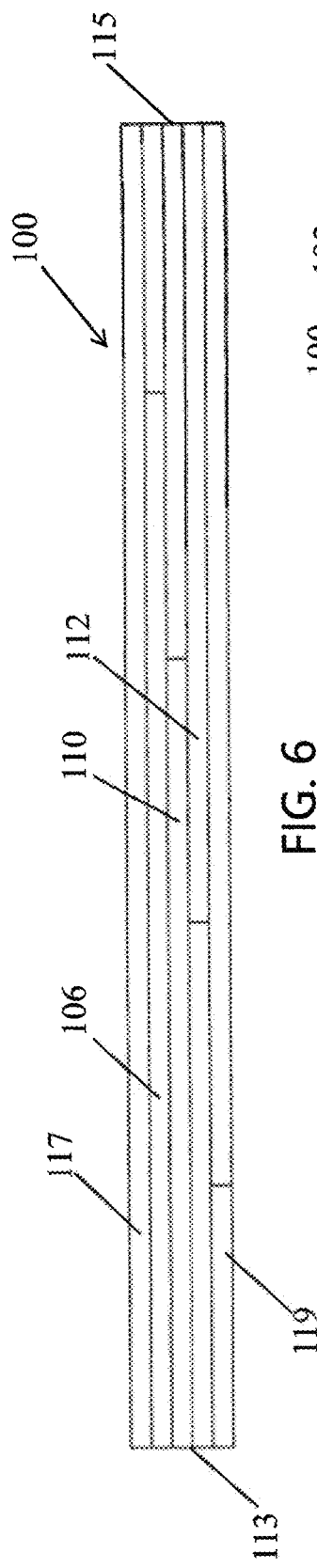
FIG. 6 is a top elevation view of the first version of the improved composite material of the present disclosure.

In one non-limiting configuration of the improved composite material, the improved composite material includes a first fiber system and an adhesive material (e.g., resin material). As illustrated in FIGS. 5 and 6, the first fiber system of the first version of the improved composite material is illustrated as being formed of a plurality of fiber layers 106, 110, 112. The fiber layers forming the first fiber system can have 1) the same or different fiber volume and/or fiber strands, 2) the same or different types of fibers, 3) the same or different tensile strength and/or tensile modulus, and/or have the same or different fiber layer thicknesses, 4) the same or different layer thickness or width, and/or 5) the same or different fiber orientation. In one non-limiting configuration, the first fiber system includes or is fully formed of carbon fibers. The fibers forming the first fiber system have a tensile strength of at least about 350 KSI and a tensile modulus of at least about 10 MSI.

FIG. 6 illustrates a non-limiting first version of the improved composite material formed of five layers having certain layer thicknesses, wherein the first fiber system is formed of three fiber layers 106, 110, 112, and a layer of dielectric insulating material 117, 119 is positioned on each side of the first fiber system. Fiber layer 106 of the first fiber system can have a thickness that is the same or greater than the thickness of all other layers of the improved composite material; however, this is not required. Fiber layers 110 and 112 of the first fiber system have generally the same thickness. In one non-limiting arrangement, the thickness or width of fiber layer 106 of the first fiber system is greater than the thickness of all other layers of the improved composite material. In one non-limiting arrangement, the thickness or width of fiber layers 110 and 112 of the first fiber system is generally the same and is less than the thickness of fiber layer 106 (e.g., width ratio of 0.1:1 to 1:1 and all values and ranges therebetween); however, this is not required. In one non-limiting arrangement, the thickness or width of dielectric insulating material layers 117 and 119 is generally less than the thickness of fiber layers 106 (e.g., width ratio of 0.02:1 to 0.6:1 and all values and ranges therebetween), and is generally less or the same as the thickness of fiber layers 110, and 112 (e.g., width ratio of 0.1:1 to 1:1 and all values and ranges therebetween); however, this is not required. In one non-limiting specific configuration, the thickness or width of the fiber layer 106 of the first fiber system is about 0.04-0.2 in. (and all values and ranges therebetween), the thickness or width of each of fiber layers 106, 110 of the first fiber system is about 0.015-0.039 in. (and all values and ranges therebetween), and the thickness or width of dielectric insulating material layers 117 and 119 is 0.05-0.014 (and all values and ranges therebetween).

The fibers layers 106, 110, and 112 of the first fiber system can be optionally connected together by a mechanical connection (stitching, stitching, staples, clips, pins, hook and loop fastener, etc.), melted bond, and/or adhesive. One or more of the fiber layers 106, 110, and 112 of the first fiber system can be formed by a fabric layer (woven or unwoven fabric layer), fiber rovings, or fibers. The fibers in the one or more fiber layers 106, 110, and 112 can be oriented parallel or non-parallel to fibers in one or more of the other fiber layers. The composition, size, and thickness of the fibers in the one or more of the fiber layers 106, 110, and 112 can the same or different from the fibers in one or more other fiber layers. In one non-limiting embodiment, the composition of at least 70% (e.g., 70-100% and all values and ranges therebetween) of the fibers of fiber layers 106, 110, and 112 are formed of carbon fibers. In another non-limiting embodiment, outer layers 117, 119 are partially or fully formed (e.g., 51-100% and all values and ranges therebetween) of a resin or plastic material.

Figure 7:
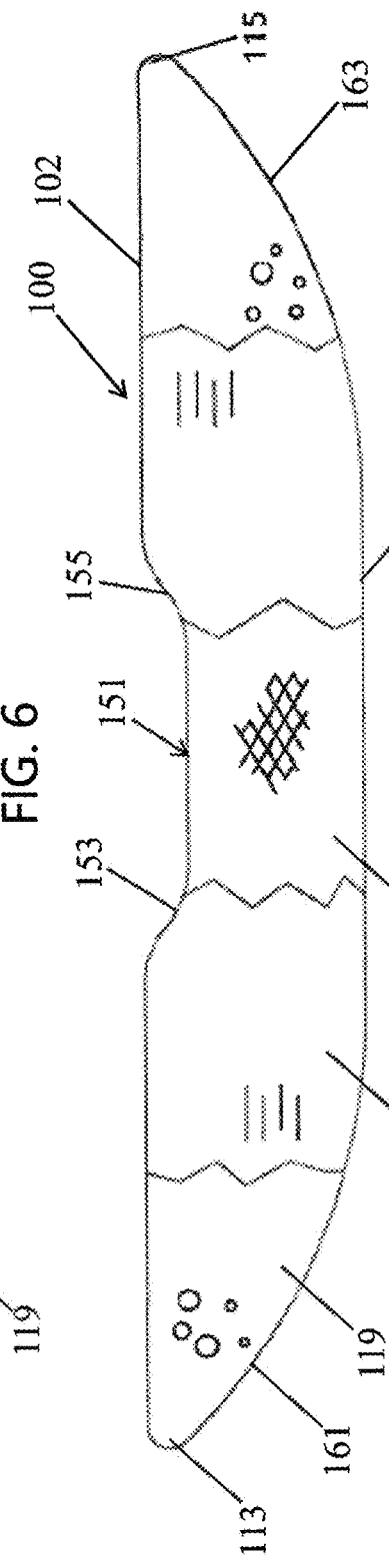
FIG. 7 is a cross-sectional view of FIG. 6.

As illustrated in FIG. 7, the cross-hatching of layer 106 illustrates that the orientation of the fibers in the fiber layer 110 are non-parallel to the longitudinal axis of the improved composite material; however, this is not required. The parallel lines of layer 112 illustrate the orientation of the fibers in the fiber layer 112 is parallel to the longitudinal axis of the improved composite material; however, this is not required. In the non-limiting embodiment of FIG. 7, the orientation of the fibers in the fiber layers 106, 112 is parallel to the longitudinal axis of the improved composite material, and the orientation of the fibers in the fiber layer 110 are non-parallel to the longitudinal axis of the improved composite material. Outer layer 117, 119 may or may not include fibers. If outer layers 117, 119 do include fibers, the orientation of the fibers in layers 117, 119 can be parallel to the longitudinal axis of the improved composite material.

As illustrated in FIGS. 5A and 10, the second version includes a first fiber system that is formed of a single layer 121 of fibers, and a layer 117, 119 of dielectric insulating material positioned on each side of the first fiber system. The first fiber system can be formed of a single fabric layer, a single layer of fiber rovings, or a single layer of fibers. The composition, size, and/or shape of the fibers in the first fiber system can be the same as described above with regard to first version of the improved composite material. The two outer layers 117, 119 are the layers of dielectric insulating material, and such layers generally have the same thickness or width and the thickness or width of each of the two outer layers is generally less than the thickness of layer 121 of the first fiber system; however, this is not required. In one non-limiting embodiment, the thickness or width of layer 121 of the first fiber system is at least 1.05 times (e.g., 1.05-500 times and all values and ranges therebetween) the thickness of each of the two outer layers 117, 119. In one non-limiting embodiment, the thickness or width of the layer 121 is about 0.02-0.5 in. (and all values and ranges therebetween), and the thickness or width of dielectric insulating material layers 117 and 119 is 0.05-0.014 (and all values and ranges therebetween).

An adhesive can optionally be applied to the one or more fiber layers of the first or second version of the improved composite material prior to or at the same time as the forming of the two outer layers are the layers of dielectric insulating material. The adhesive (when used) is used to partially or fully bond together one or more of the fiber layers, and/or to partially or fully saturate one or more of the fiber layers. The one or more fiber layers of the first fiber system can optionally be pressed together until the adhesive dries/cures to facilitate in the partial or full bonding together one or more of the fiber layers, and/or to facilitate in the partial or full saturation of the one or more of the fiber layers. A vacuum can optionally be applied during the pressing and drying/curing steps of the adhesive; however, this is not required. Generally, the adhesive is allowed to dry/cure and harden prior to the improved composite material being placed in the cut slot.

When the outer layer of the improved composite material is formed of a non-fiber layer (e.g., resin layer, plastic layer, polymer layer, etc.), the outer layers can be applied after the adhesive has dried/cured, before the adhesive has dried/cured, or at the same time as the adhesive if applied to the first fiber system. When the adhesive is a resin material, the same material for the adhesive can optionally be used to form the outer layers.

When the outer layers of the improved composite material are formed of a non-fiber layer, the outer layers can optionally be textured to improve the bonding strength of the improved composite material to the concrete when placed in the cut slot with the material used to connect the improved composite material to the concrete.

Figure 8:
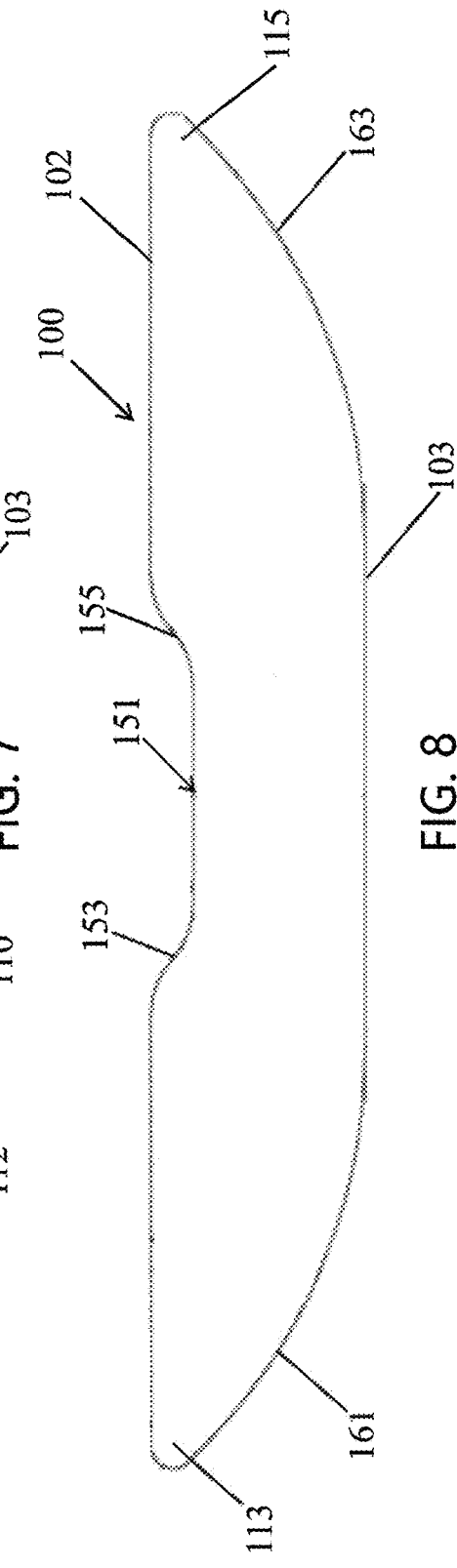
FIG. 8 is a side view of the first version of the improved composite material that illustrates dimensions of the improved composite material.

The improved composite material has a top edge 102, a bottom edge 103, a first end 113, and a second end 115. The first and second ends are illustrated as having a curved surface between the top and bottom edges; however, one or both of the ends can be straight or include some other shape. As illustrated in FIGS. 7-8, a majority (e.g., 50.01-90% and all values and ranges therebetween) of the top edge of the first version of the improved composite material is illustrated as being generally parallel to the bottom edge; however, this is not required. As illustrated in FIGS. 9 and 11, less than a majority (e.g., 0-45% and all values and ranges therebetween) of the top edge of the second version of the improved composite material is illustrated as being non-parallel to the bottom edge.

As illustrated in FIGS. 7-8, the top edge of the first version of the improved composite material that is parallel or generally parallel to the bottom edge is illustrated as having a longitudinal length that is greater than a longitudinal length of the bottom edge; however, this is not required. Generally, the length of the bottom edge of the first version of the improved composite material that is parallel or generally parallel to the top edge is about 10-99% (and all values and ranges therebetween) of the length of the top edge, typically about 25-95% of the length of the top edge, and more typically about 50-95% of the length of the top edge.

As illustrated in FIGS. 9 and 11, the second version of the improved composite material has a top edge and a bottom edge formed of curved surfaces. As such, very little of the top edge of the second version of the improved composite material is parallel to the bottom edge of the second version of the improved composite material. In one non-limiting embodiment, the radius of curvature of the end portions 141, 143 of top edge of the second version of the improved composite material is 20-80 in. (and all values and ranges therebetween). In one non-limiting embodiment, the radius of curvature of the bottom edge 145 of the second version of the improved composite material is 10-50 in. (and all values and ranges therebetween). In one non-limiting embodiment, the radius of curvature of the bottom edge 145 of the second version of the improved composite material is less than the radius of curvature of the end portions 141, 143 of top edge of the second version of the improved composite material. The radius of curvature of the two bottom side ends 161, 163 is about 3-20 in. (and all values and ranges therebetween), and typically about 5-10 in. The longitudinal length of the improved composite material is generally 5-40 in. (and all values and ranges therebetween), and typically about 12-20 in.

As illustrated in FIGS. 3-11, the top edge 102 of the first and second versions of the improved composite material include a recessed portion 151 and optionally two curved end portions 153, 155. The longitudinal length of the recessed portion 151 is generally 5-60% (and all values and ranges therebetween) the longitudinal length of the top edge of the first and second versions of the improved composite material, and typically longitudinal length of the recessed portion is 10-40% the longitudinal length of the first and second versions of the top edge of the improved composite material. The maximum depth of the recess portion is generally 5-60% (and all values and ranges therebetween) the maximum height of the first and second versions of the improved composite material, and typically maximum depth of the recessed portion is 10-40% the maximum depth of the first and second versions of the improved composite material. The recess portion of the first version of the improved composite material is illustrated as having a generally constant depth along 20-95% (and all values and ranges therebetween) the longitudinal length of the recess portion, and typically the recess portion has a generally constant depth along 60-95% the longitudinal length of the recess portion. The recess portion of the second version of the improved composite material is illustrated as having a generally arcuate or curved profile along 50-100% (and all values and ranges therebetween) the longitudinal length of the recess portion. In one non-limiting embodiment, the maximum height of the improved composite material is about 1-10 in. (and all values and ranges therebetween), and typically about 2-4 in. The maximum depth of the recess portion 151 is about 0.1-3 in. (and all values and ranges therebetween), and typically about 0.2-1 in. Generally, the ratio of the maximum depth of the recess portion 151 to the maximum height of the improved composite material is 0.1:1 to 0.9:1 (and all values and ranges therebetween), and typically 0.15:1 to 0.3:1. Generally, the ratio of the maximum longitudinal length of the recess portion 151 to the maximum longitudinal length of the improved composite material is 0.1:1 to 0.7:1 (and all values and ranges therebetween), and typically 0.2:1 to 0.4:1. In another non-limiting embodiment, the longitudinal length of the recess portion 151 is generally the same or less than the longitudinal length of the linear portion of the bottom edge of the first version of the improved composite material of FIGS. 7 and 8, or is generally the same or less than the longitudinal length of the curved central portion of the bottom edge of the second version of the improved composite material of FIGS. 9 and 11. In one specific non-limiting configuration, the longitudinal length of the recess portion 151 is less than the longitudinal length of the linear portion of the bottom edge of the first version of the improved composite material of FIGS. 7 and 8, or is less than the longitudinal length of the curved central portion of the bottom edge of the second version of the improved composite material of FIGS. 9 and 11.

As illustrated in FIGS. 3-11, the ends 113, 115 of the improved composite material are illustrated as being rounded; however, this is not required. Such rounding of the ends facilitates in reducing cracking the concrete at or near the ends of the improved composite material. In one non-limiting arrangement, the radius of curvature of the ends, when one or both ends are rounded, is about 0.1-1 (and all values and ranges therebetween), and generally about 0.15-0.5, and typically 0.2-0.3 in.

Once the improved composite material has been fully formed (e.g., adhesive cured, all mechanical connections applied, etc.) the improved composite material can be cut to a desired size and shape. The thickness of the improved composite material can be uniform or vary along the longitudinal length of the improved composite material. When fully formed, the improved composite material has a tensile strength along the x-y axis or longitudinal axis of at least about 55 KSI, a compressive strength along the x-y axis or longitudinal axis of at least about 45 KSI, a compressive strength through the z axis or thickness of at least about 5.5 KSI, a shear strength through the z axis or thickness of at least about 11 KSI, and/or an inter laminar shear along the x-y axis or longitudinal axis of at least about 1.1 KSI.

Figure 12:
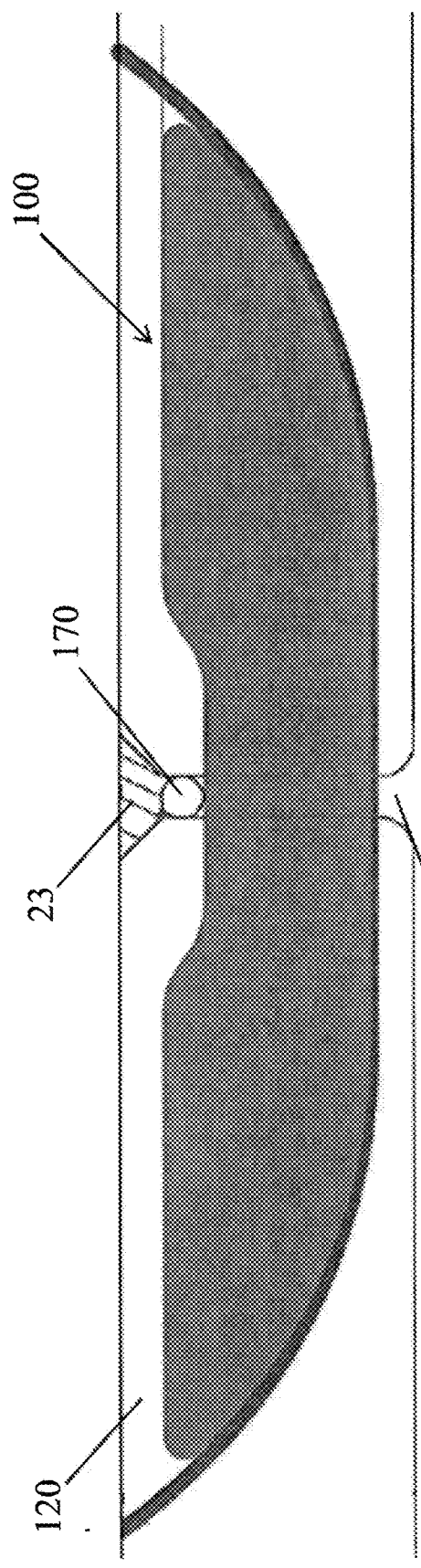
FIG. 12 is a sectional side elevation view of the pre-existing sections of concrete joined by the first version of the improved composite material of the present disclosure.
Figure 13:
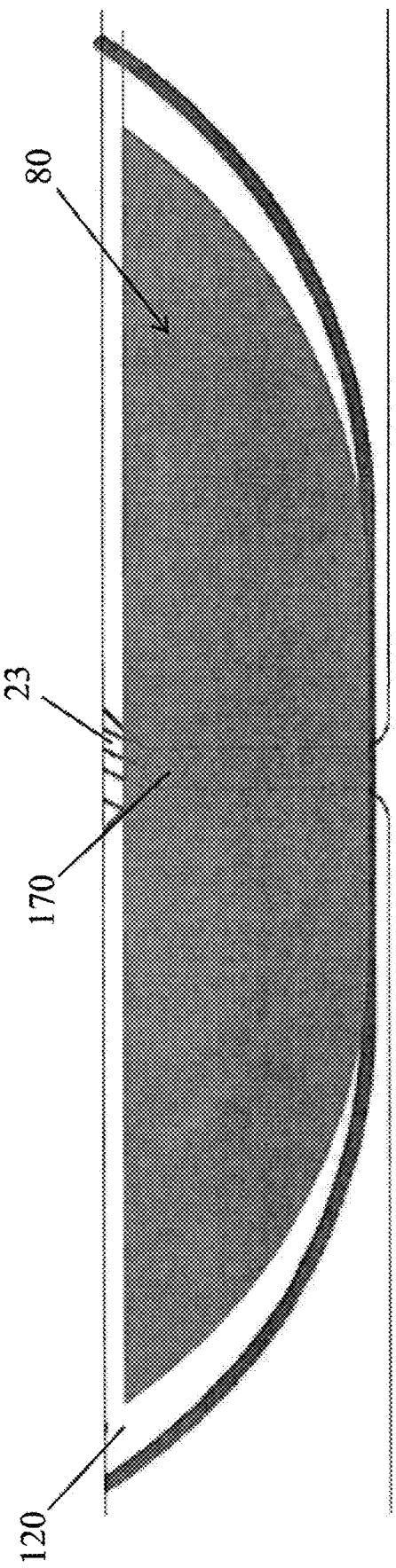
FIG. 13 is a sectional side elevation view of the pre-existing sections of concrete of FIG. 3 joined by a prior art Biscuit®.

One non-limiting method in accordance with the present disclosure includes: 1) cutting a slot in the concrete such that the slot crosses the longitudinal axis of the gap 25 between the T-shaped planks 30; 2) optionally forming a V-shaped top opening 181 in the cut slot; 3) optionally cleaning the cut slot of debris prior to inserting the improved composite material in the cut slot; 4) optionally inserting an adhesive on one or both sides of the improved composite material prior to inserting the improved composite material into the cut slot; 5) inserting the improved composite material into the cut slot; 6) inserting an adhesive in the cut slot to secure the improved composite material in the cut slot; and 7) allowing the adhesive to dry and/or cure;

FIG. 12 illustrates a comparison of the improved composite material to a prior art Biscuit® in FIG. 13. As illustrated in FIG. 12, the improved composite material is configured to better fit in the cut slot at the base of the improved composite material as compared to the prior art Biscuit®. The improved fit reduces the amount of stress concentration between the base of the improved composite material and the cut slot, thereby reducing the incidence of cracking in adhesive used to secure the improved composite material in the cut slot and also reducing the incidence of crack formation in the concrete. The lower profile of the improved composite material as a result of the recess portion 151 allows the backer rod 170 to be placed over the improved composite material without having to cut the backer rod at each prior art Biscuit® location. When a V-shaped opening 181 is optionally formed in the top portion of the cut slot, such V-shaped opening facilitates in the placement of the backer rod and the proper application of the sealant over the backer rod.

The lower profile of the improved composite material (compared to the prior art Biscuit®) ensures that sufficient qualities of adhesive material can be positioned on the top edge of the improved composite material to avoid the adhesive from popping out of the cut slot.

As illustrated in FIGS. 12 and 13, the top edge of the improved composite material is positioned lower than the top edge of the prior art Biscuit®. Generally, the top edge of the improved composite material is positioned 0.5-in. below the top surface of the concrete surface. Such a configuration allows for easy insertion of the backer rod and the application of the sealant over the backer rod. As also illustrated in FIGS. 12 and 13, the bottom profile of the improved composite material better conforms to the shape of the cut slot as compared to the prior art Biscuit®.

FIGS. 14-18 illustrate the testing methods and results of the degree of strain and deflection of the improved composite material as compared to the prior art Biscuit®.

To compare the improved composite material to the prior art Biscuit®, a series of vertical load application tests were conducted. A set of concrete tee flanges were joined together by the improved composite material and the prior art Biscuit®. The tee stems rested on a rolling support to allow the flanges to rotate, while having steel channel supports on top of the end of the tees connected to the base of the test fixture. The steel channels mimicked how the weight and connections to adjacent tees do not allow for a three-point bend to occur over the flange joints. Vertical load was applied from two hydraulic cylinders up to 8,000 lbs. over a load head to distribute the load through an area equal to the average vehicles tire contact area. The deflection was measured on each side of the joint connection using string potentiometers to compare the stiffness of the improved composite material to the prior art Biscuit®.

The improved composite material and the prior art Biscuit® had strain gauges installed on both sides. The strain gauges were used to measure the stress locally and the direction of stress in the improved composite material as compared to the prior art Biscuit®.

Strain gauges in the horizontal direction in the prior art Biscuit® have the strain in tension, but in the improved composite material in the same location the strain is in compression. Compressive strain in those locations in the improved composite material is an improvement because tensile loads cause the concrete to fail/crack, allowing water/contaminates to go through the deck. Also, the strain values in the improved composite material are lower at the same load applied to the prior art Biscuit®.

Figure 14:
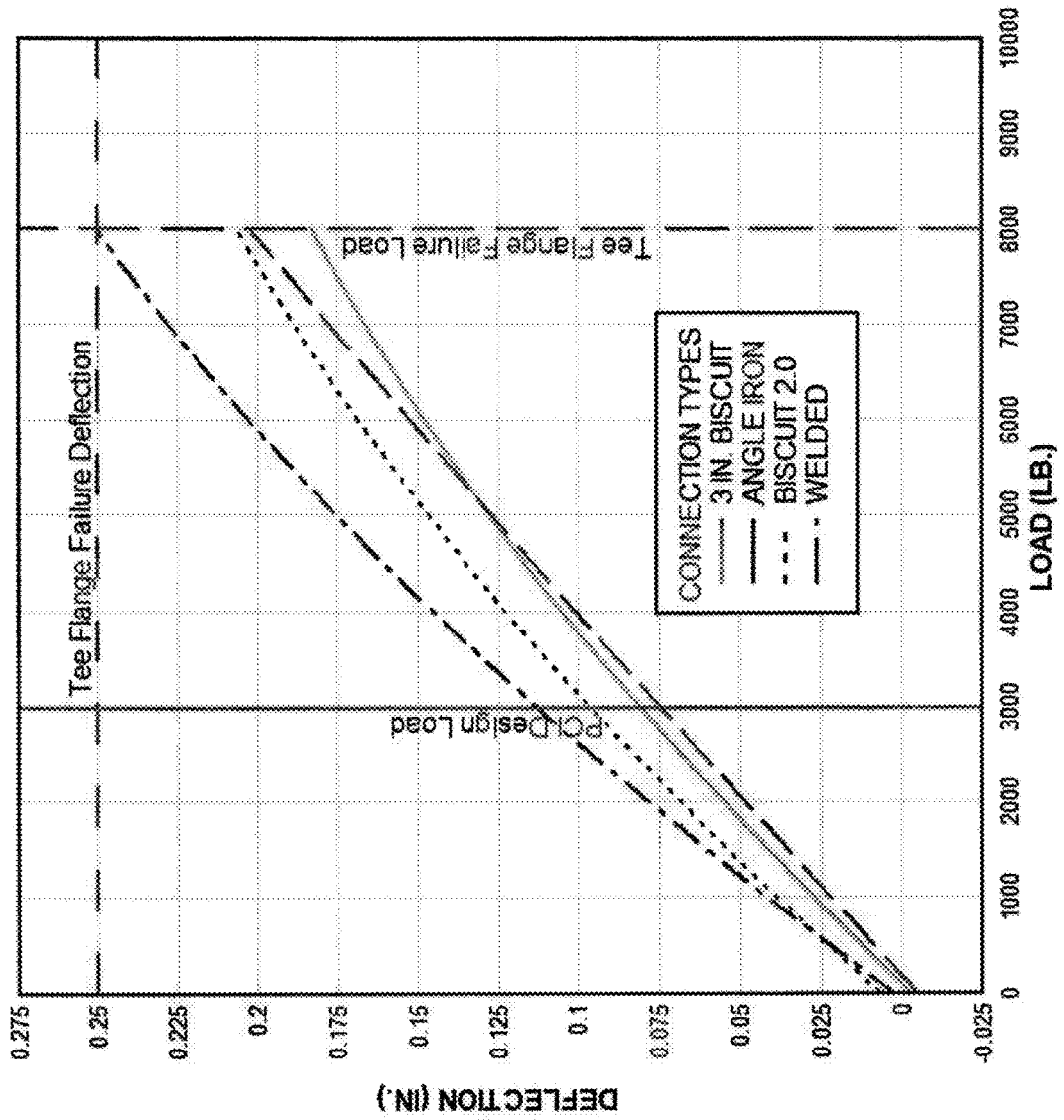
FIG. 14 is a chart illustrating the amount of deflection of various connection arrangements verses the load applied to the connection created by the connection arrangements; and, FIGS. 15-18 are tables illustrating the test results of the first version of the improved composite material as compared to an existing Biscuit® and a steel slab connection.
Figure 15:
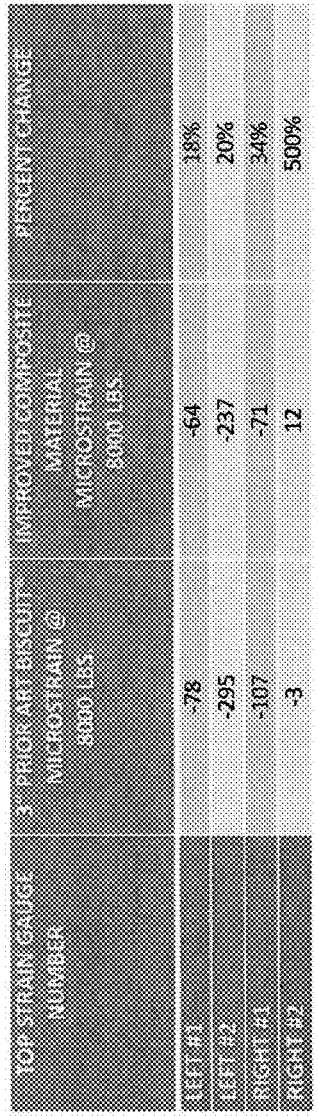
Figure 16:
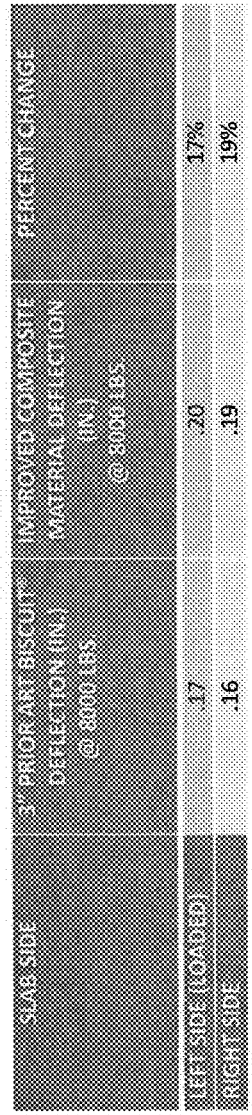
Figure 17:
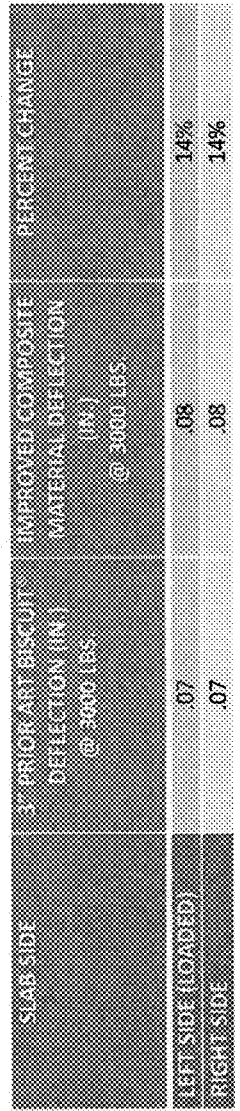
Figure 18:
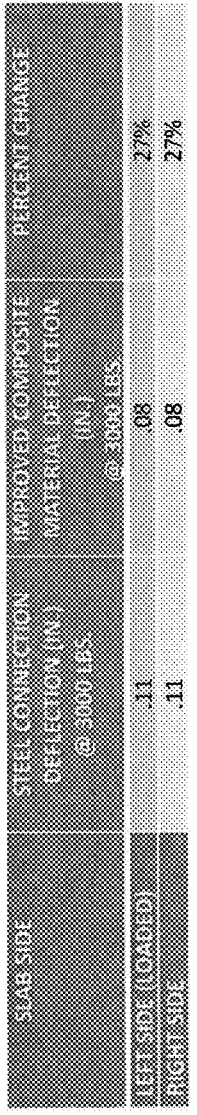

Strain gauges were also placed on the top surface of the concrete tees beside the cut slot as illustrated in FIG. 14. FIGS. 15-18 illustrate that the improved composite material is more flexible than the prior art Biscuit®, but the improved composite material is stiffer than a welded steel connection. The improved composite material allows for more deflection in the vertical direction than the prior art Biscuit®, thereby giving the joint more flexibility to move without cracking the concrete.

It will thus be seen that the objects set forth above, among those made apparent from the preceding description, are efficiently attained, and since certain changes may be made in the constructions set forth without departing from the spirit and scope of the disclosure, it is intended that all matter contained in the above description and shown in the accompanying drawings shall be interpreted as illustrative and not in a limiting sense. The disclosure has been described with reference to non-limiting and alternate embodiments. Modifications and alterations will become apparent to those skilled in the art upon reading and understanding the detailed discussion of the disclosure provided herein. This disclosure is intended to include all such modifications and alterations insofar as they come within the scope of the present disclosure. It is also to be understood that the following claims are intended to cover all of the generic and specific features of the disclosure herein described and all statements of the scope of the disclosure, which, as a matter of language, might be said to fall therebetween.

What is claimed:

1. A composite material repair device for use in connecting, strengthening, and/or repairing concrete that comprises a first fiber system; said composite material repair device has a top edge, a bottom edge, a first top edge end, a second top edge end, a front face, and a back face; said top edge includes a non-linear profiled edge that includes a recessed portion positioned between said first and second top edge ends; at least a portion of said recessed portion is located at a midpoint between said first and second top edge ends; a longitudinal length of said recessed portion is 5-60% of a longitudinal length of said composite material repair device that is measured from said first top edge end to said second top edge end; a maximum depth of said recessed portion is 5-50% of a maximum height of said composite material repair device as measured from said top edge to said bottom edge of said composite material repair device; said first fiber system includes a first fiber layer and a second fiber layer; each of said first and second first fiber layers includes a plurality of fibers; said plurality of fibers in said first and second fiber layers are connected together by a first adhesive or resin material; said first and second fibers layers are connected together by a second adhesive or resin material along all of said longitudinal length of said composite material repair device; said first and second fiber layers are continuous along said longitudinal length of said composite material repair device; said first fiber system forms at least a portion of said first and second top edges of said composite material repair device and at least a portion of said recess portion; said longitudinal length of said composite material repair device is no more than 25 inches; a maximum width of said composite material repair device is no more than 0.5 inches; said maximum height of said composite material repair device is no more than 6 inches; said first and second top edge ends each include a curved surface.

2. The composite material repair device as defined in claim 1, wherein said first fiber system includes a three third fiber layer; said third fiber layer is formed of a plurality of said fibers; said plurality of fibers in said third fiber layer is connected together by a third adhesive or resin material.

3. The composite material repair device as defined in claim 2, wherein said second fiber layer is positioned between said first and third fiber layers; said first and third fiber layers have a same composition, a same thickness, a same shape, and/or a same fiber orientation.

4. The composite material repair device as defined in claim 3, wherein said second fiber layer has a different thickness, a different fiber orientation, and/or a different fiber composition from the first and/or third fiber layer; said second fiber layer has a same shape as said first and third fiber layers.

5. The composite material repair device as defined in claim 1, further including a dielectric insulating material that is secured to at least a portion of an outer surface of said first fiber layer; said dielectric insulating material has a thickness than is less than a thickness of said first fiber layer.

6. The composite material repair device as defined in claim 3, further including a dielectric insulating material that is secured to at least a portion of an outer surface of said first and third fiber layers; said dielectric insulating material has a thickness than is less than a thickness of each of said first and third fiber layers.

7. The composite material repair device as defined in claim 5, wherein said dielectric insulating material is formed of a different material from said first fiber layer.

8. The composite material repair device as defined in claim 6, wherein said dielectric insulating material is formed of a different material from each of said first and third fiber layers.

9. The composite material repair device as defined in claim 1, wherein said first fiber system includes one or more fibers selected from the group consisting of carbon fibers, glass fibers, aramid fibers, boron fibers, and basalt fibers.

10. The composite material repair device as defined in claim 8, wherein said first fiber system includes one or more fibers selected from the group consisting of carbon fibers, glass fibers, aramid fibers, boron fibers, and basalt fibers.

11. The composite material repair device as defined in claim 1, wherein said composite material repair device no openings through said front and back face.

12. The composite material repair device as defined in claim 10, wherein said composite material repair device no openings through said front and back face.

13. A composite material repair device for use in connecting, strengthening, and/or repairing concrete that comprises a first fiber system; said composite material repair device has a top edge, a bottom edge, a first top edge end, a second top edge end, a front face, and a back face; said top edge includes a non-linear profiled edge that includes a recessed portion positioned between said first and second top edge ends; at least a portion of said recessed portion is located at a midpoint between said first and second top edge ends; a longitudinal length of said recessed portion is at least 5% of a longitudinal length of said composite material repair device that is measured from said first top edge end to said second top edge end; a maximum depth of said recessed portion is at least 5% of a maximum height of said composite material repair device as measured from said top edge to said bottom edge of said composite material repair device; said first fiber system includes a first fiber layer and a second fiber layer; said first and second fibers layers are at least partially connected together by a first layer adhesive or resin material along at least a portion of said longitudinal length of said composite material repair device; said first and second fiber layers are continuous along said longitudinal length of said composite material repair device; said first fiber system forms at least a portion of said first and second top edges of said composite material repair device and at least a portion of said recess portion; said longitudinal length of said composite material repair device is no more than 25 inches; said first and second top edge ends each include a curved surface.

14. The composite material repair device as defined in claim 13, wherein said first fiber system includes a third fiber layer; said third fiber layer is connected to said first or second fiber layer by a third layer adhesive or resin material along at least a portion of said longitudinal length of said composite material repair device.

15. The composite material repair device as defined in claim 14, wherein said second fiber layer is positioned between said first and third fiber layers; said first and third fiber layers have a same composition, a same thickness, a same shape, and/or a same fiber orientation; said third layer adhesive or resin material has a same composition as said first layer adhesive or resin material.

16. The composite material repair device as defined in claim 15, wherein said second fiber layer has a different thickness, a different fiber orientation, and/or a different fiber composition from the first and/or third fiber layer; said second fiber layer has a same shape as said first and third fiber layers.

17. The composite material repair device as defined in claim 13, further including a dielectric insulating material that is secured to at least a portion of an outer surface of said first fiber layer; said dielectric insulating material has a thickness than is less than a thickness of said first fiber layer; said dielectric insulating material has a different composition from said first fiber layer.

18. The composite material repair device as defined in claim 13, further including a dielectric insulating material that is secured to at least a portion of an outer surface of said first and third fiber layers; said dielectric insulating material has a thickness than is less than a thickness of each of said first and third fiber layers; said dielectric insulating material has a different composition from said first and third fiber layers.

19. The composite material repair device as defined in claim 13, wherein said first fiber system includes one or more fibers selected from the group consisting of carbon fibers, glass fibers, aramid fibers, boron fibers, and basalt fibers.

20. The composite material repair device as defined in claim 17, wherein said first fiber system includes one or more fibers selected from the group consisting of carbon fibers, glass fibers, aramid fibers, boron fibers, and basalt fibers; said dielectric insulating material is at least partially formed of fiberglass fibers, poly-para-phenylene terephthalamide fibers, and/or resin material.

21. The composite material repair device as defined in claim 13, wherein said first and third fiber systems include one or more fibers selected from the group consisting of carbon fibers, glass fibers, aramid fibers, boron fibers, and basalt fibers.

22. The composite material repair device as defined in claim 18, wherein said first and third fiber systems include one or more fibers selected from the group consisting of carbon fibers, glass fibers, aramid fibers, boron fibers, and basalt fibers; said dielectric insulating material is at least partially formed of fiberglass fibers, poly-para-phenylene terephthalamide fibers, and/or resin material.

23. The composite material repair device as defined in claim 13, wherein said composite material repair device no openings through said front and back face.

24. The composite material repair device as defined in claim 14, wherein said composite material repair device no openings through said front and back face.

25. The composite material repair device as defined in claim 16, wherein said composite material repair device no openings through said front and back face.

* * * * *